(12) United States Patent
Brown et al.

(10) Patent No.: US 11,178,809 B1
(45) Date of Patent: *Nov. 23, 2021

(54) NOZZLE, VALVE, AND MANIFOLD ASSEMBLY FOR PRECISION APPLICATION OF CROP PROTECTANT

(71) Applicant: Blue River Technology Inc., Sunnyvale, CA (US)

(72) Inventors: Thomas W. Brown, Santa Clara, CA (US); Eric M. Gawehn, Mountain View, CA (US); Kent Anderson, Mountain View, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/543,591

(22) Filed: Aug. 18, 2019

Related U.S. Application Data

(63) Continuation of application No. 15/422,370, filed on Feb. 1, 2017, now Pat. No. 10,390,481.

(Continued)

(51) Int. Cl.
*A01C 23/04* (2006.01)
*A01C 23/00* (2006.01)
(Continued)

(52) U.S. Cl.
CPC .......... *A01C 23/047* (2013.01); *A01C 23/008* (2013.01); *B05B 1/04* (2013.01);
(Continued)

(58) Field of Classification Search
CPC ....... A01C 23/047; A01C 23/008; B05B 1/04; B05B 7/0093; B05B 7/2486; B05B 12/122; B05B 13/005
(Continued)

(56) References Cited

U.S. PATENT DOCUMENTS 4,817,870 A    4/1989  Dalton
5,971,294 A   10/1999  Thompson et al.
(Continued)

FOREIGN PATENT DOCUMENTS

EP           3316673 A1    5/2018
WO      WO 2016/090414    6/2016
(Continued)

OTHER PUBLICATIONS

Pentair, "Hypro Shurflo Pumps, Spray Nozzles, and Accessories Product Catalog," 2016, 284 Pages, (Specifically pp. 47-50 and 166-167).

*Primary Examiner* — Steven J Ganey
(74) *Attorney, Agent, or Firm* — Fenwick & West LLP

(57) ABSTRACT

A treatment system for spraying treatment fluid onto plants in a field is described. The treatment system includes a highly configurable treatment mechanism including an array of nozzles and valve assemblies coupled into manifolds, and manifold assemblies. The manifolds of the manifold assemblies can be oriented in an open state or a nested state, the open state with no overlap between nozzles of adjacent manifolds and the nested state with overlap between nozzles of adjacent manifolds. The manifolds can have multiple configurations, examples of which include a tube manifold and an offset manifold. The nozzles of the system can have multiple configurations, examples of which include a tri-spray nozzle, a bar nozzle, a fan nozzle, and a deflected fan nozzle. The system can be controlled by a system controller which detects plant material and instructs a nozzle or combination of nozzles to spray treatment fluid.

20 Claims, 20 Drawing Sheets

Related U.S. Application Data

(60) Provisional application No. 62/422,424, filed on Nov. 15, 2016, provisional application No. 62/289,804, filed on Feb. 1, 2016.

(51) Int. Cl.
  *B05B 1/04*  (2006.01)
  *B05B 13/00*  (2006.01)
  *B05B 7/24*  (2006.01)
  *B05B 12/12*  (2006.01)
  *B05B 7/00*  (2006.01)

(52) U.S. Cl.
  CPC .......... *B05B 7/0093* (2013.01); *B05B 7/2486* (2013.01); *B05B 12/122* (2013.01); *B05B 13/005* (2013.01)

(58) Field of Classification Search
  USPC ................ 239/159, 163, 170, 172, 550, 562
  See application file for complete search history.

(56) References Cited

U.S. PATENT DOCUMENTS

| | | | |
|---|---|---|---|
| 6,036,107 A | 3/2000 | Aspen et al. | |
| 6,776,355 B2 | 8/2004 | Ringer et al. | |
| 8,028,927 B2 * | 10/2011 | Ward | A01M 7/0089 239/1 |
| 8,191,795 B2 * | 6/2012 | Grimm | A01M 7/0089 239/1 |
| 10,390,481 B1 * | 8/2019 | Brown | A01C 23/04 |
| 2003/0019949 A1 * | 1/2003 | Solie | A01M 7/0089 239/172 |
| 2005/0000277 A1 * | 1/2005 | Giles | A01M 7/0096 73/114.48 |
| 2018/0022208 A1 | 1/2018 | Calleija et al. | |

FOREIGN PATENT DOCUMENTS

| | | |
|---|---|---|
| WO | WO 2016/123656 | 8/2016 |
| WO | WO 2016/191825 | 12/2016 |

* cited by examiner

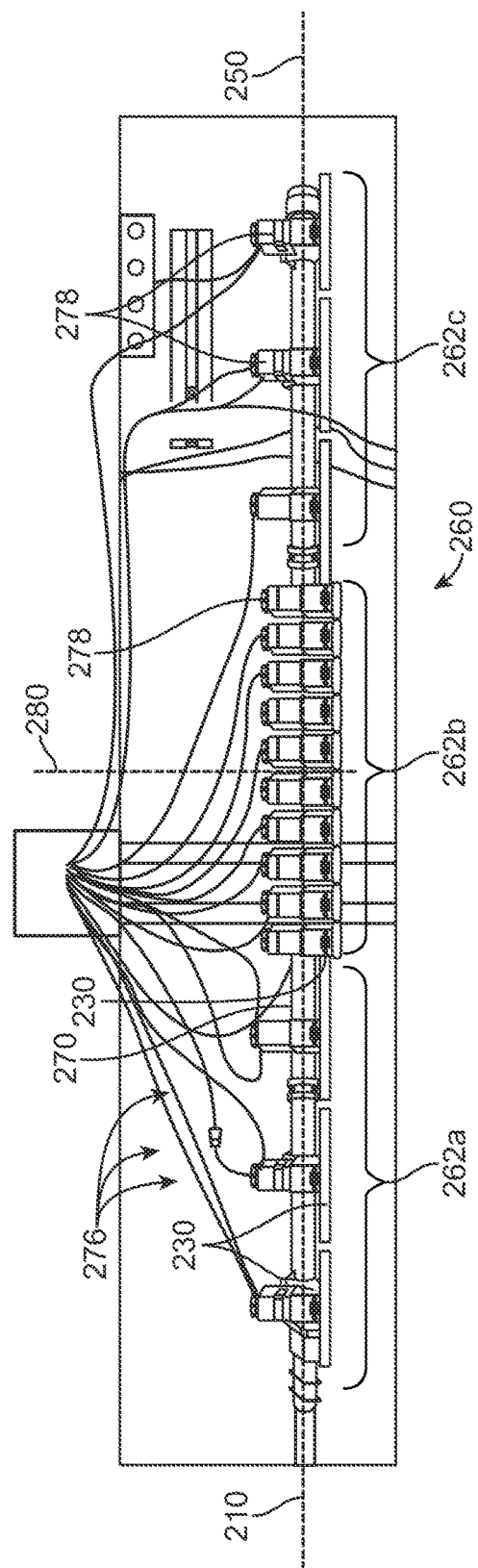
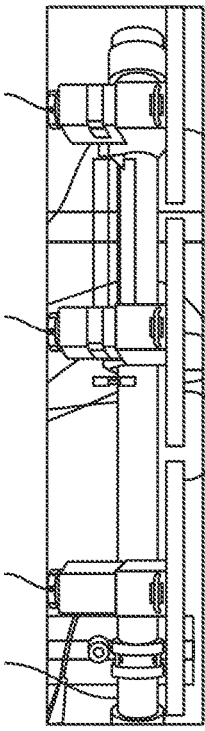
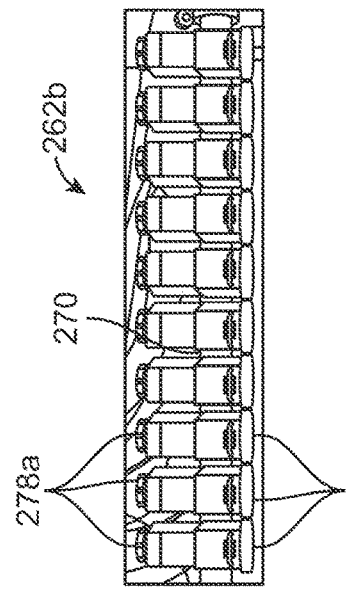
FIG. 2C
FIG. 2D
FIG. 2E
FIG. 2F

NOZZLE, VALVE, AND MANIFOLD ASSEMBLY FOR PRECISION APPLICATION OF CROP PROTECTANT

CROSS-REFERENCE TO RELATED APPLICATIONS

This application claims the benefit of U.S. application Ser. No. 15/422,370, filed Feb. 1, 2017 which claims the benefit of U.S. Provisional Application No. 62/289,804, filed Feb. 1, 2016 and U.S. Provisional Application No. 62/422,424, filed Nov. 15, 2016, the contents of which are hereby incorporated by reference in their entirety.

BACKGROUND

Field of Disclosure

This application relates to a system for applying treatment fluid to plants in a field, and more specifically to nozzle and valve assembly arrays and nozzle structures.

Description of the Related Art

Current methods of spraying crop protectant on a post-emergent crop typically fall in two categories: a total field broadcast sprayer, or a hooded broadcast sprayer. A total field broadcast sprayer indiscriminately applies treatment fluid to crops in a field, while the hooded broadcast sprayer introduces components to limit the ability of the treatment fluid to affect crops in adjacent fields. The resolution of these sprayers is minimal, with the broadcast sprayers generally applied on a field level.

There are a few broadcast sprayers that limit the amount of spray applied to a field by applying color recognition software to a camera coupled to the detect the presence of 'green' to indicate plants to spray. To date there is no solution for sprayers to apply treatments to targeted areas in a more specific way than 'green/not green,' nor is there a way to apply treatment to plants in rows having varying crop row widths with minimal overspray, and further no way to accomplish variable spray patterns.

SUMMARY

Described is a system for applying treatment fluid to plants in a field including any number of nozzles and valve assemblies. The nozzles each include a nozzle inlet and a nozzle exit, the nozzle exits aligned parallel to a nozzle row that is substantially perpendicular to the need line. The valve assemblies each include a valve exit fluidically coupled to the nozzle inlets to feed nozzle treatment fluid into the nozzle inlets. The nozzles and valve assemblies can be grouped into manifolds which can be further grouped into manifold assemblies. The manifold assemblies are coupled such that the manifolds of each assembly can be in an open state in which there is no overlap between nozzles of adjacent manifolds or a nested state in which there is at least some overlap between nozzles of adjacent manifolds.

The nozzles can be grouped into any number of cassettes, the cassettes coupling the nozzles to the manifolds. In one embodiment, the cassettes of the manifolds are coupled such that they are offset and there is no overlap between nozzles of each cassette along the seed line and nozzle row. In the nested state of this embodiment, back side of a first cassette of a first manifold overlaps the front side of a second adjacent cassette along the nozzle axis such that there is overlap between the nozzles of the manifolds along the nozzle axis.

In another embodiment, the cassettes of the manifold are oriented such there is no overlap between nozzles of each cassette along the seed line, but the nozzles of each cassette overlap along the nozzle axis. In the nested state of this embodiment, a first manifold and second manifold are offset from one another in the direction of the seed line such that the nozzle exits of the first manifold and the second manifold can at least partially overlap along the nozzle axis.

Each cassette can have any number of nozzles and valve assemblies grouped in any number. Each of the nozzles of the cassette, or groups of nozzles, can be independently controlled and configured. The nozzles can include a tri-spray nozzle, a bar nozzle, a fan nozzle, and an offset fan nozzle, each nozzle having a different spray pattern.

Each valve assembly can include an injection solenoid coupled to the system controller for controlling injection of treatment fluid into the spray nozzle. The solenoid of the valve assembly can control a spring plunger for pushing treatment fluid into the nozzle as the solenoid raises and lowers the spring plunger. The valve assemblies are fluidically coupled to at least one treatment reservoir and pump system configured to move treatment fluid into the valve assemblies.

The system may also include a system controller for detecting plant material and sending instructions through the system to induce spraying of plant material as the system moves through the field.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

FIG. 1A is a side view illustration of a system for applying a treatment fluid to plants in a field, according to one embodiment.

FIG. 1B is a front view illustration of a system for applying a treatment fluid to plants in a field, according to one embodiment.

FIG. 1C is an illustration of the fluidic components and couplings of the system, according to one example embodiment.

FIG. 2A illustrates a tube manifold assembly in an open state, in one example embodiment.

FIG. 2B illustrates a tube manifold assembly in a nested state, in one example embodiment.

FIG. 2C illustrates a front isometric view of a tube manifold, in one example embodiment.

FIG. 2D illustrates a front view of a middle cassette of a tube manifold, in one example embodiment.

FIG. 2E illustrates a front view of right cassette of a tube manifold, in one example embodiment.

FIG. 2F illustrates a front view of a tube manifold including a cassette for each valve assembly, in one example embodiment.

FIG. 3A illustrates an offset manifold assembly in an open state, in one example embodiment.

FIG. 3B illustrates an offset manifold assembly in a nested state, in one example embodiment.

FIG. 3C illustrates an isometric view of the offset manifold, in one example embodiment.

FIG. 3D illustrates a planar view of the bottom of the offset manifold, in one example embodiment.

DETAILED DESCRIPTION

I. Plant Treatment System

Figure 1A:
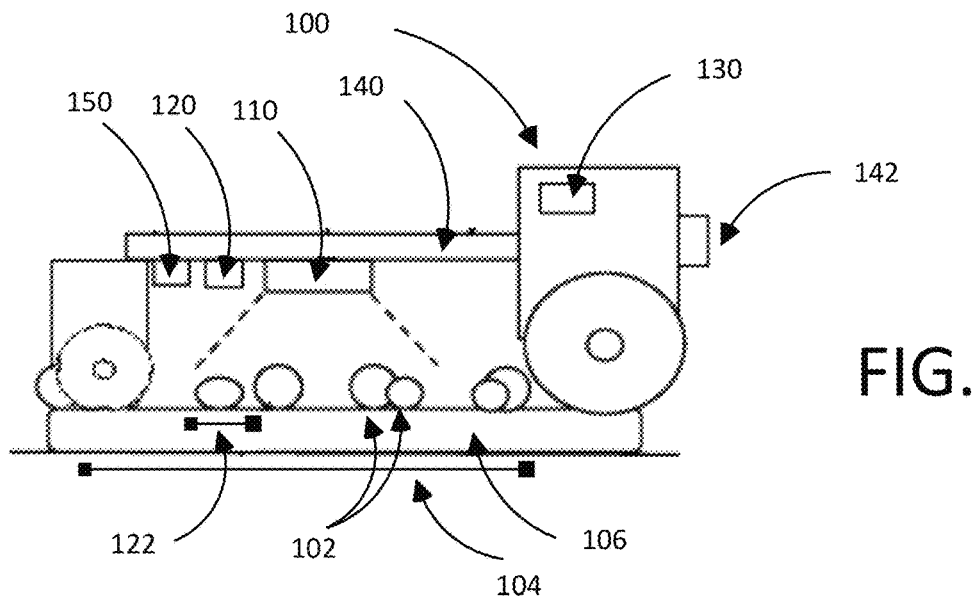
Figure 1B:
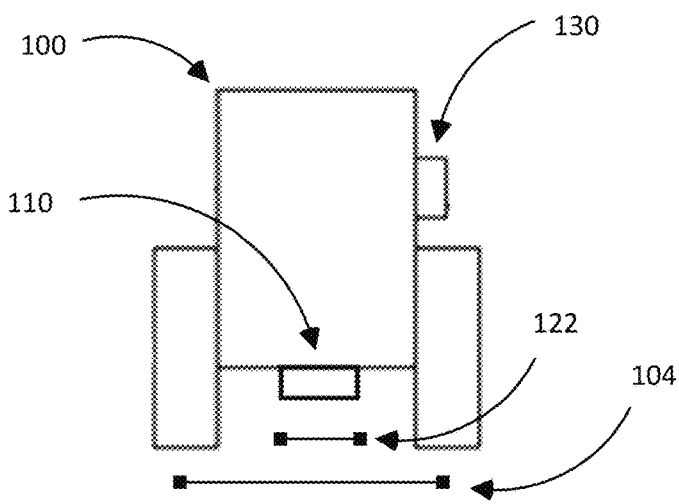

FIG. 1A is a side view illustration of a system for applying a treatment fluid to plants in a field and FIG. 1B is a front view illustration of the same system. The system 100 for plant treatment includes a detection mechanism 110, a treatment mechanism 120, and a control system 130. The system 100 can additionally include a mounting mechanism 140, a verification mechanism 150, a power source, digital memory, communication apparatus, or any other suitable component.

The system 100 functions to apply a treatment to one or multiple plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant 102 growth can include promoting plant growth, promoting growth of a plant portion, hindering (e.g., retarding) plant or plant portion growth, or otherwise controlling plant growth. Examples of regulating plant 102 growth includes applying growth hormone to the plant, applying fertilizer to the plant or substrate 106, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The treatment mechanism 120 of the system 100 functions to apply a treatment to the identified plant 102. The treatment mechanism 120 includes an active area 122 to which the treatment mechanism 120 applies the treatment. The effect of the treatment can include plant necrosis, plant growth stimulation, plant portion necrosis or removal, plant portion growth stimulation, or any other suitable treatment effect. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The system 100 can include a single treatment mechanism 120, or can include multiple treatment mechanisms. The multiple treatment mechanisms can be the same type of treatment mechanism, or be different types of treatment mechanisms. The treatment mechanism 120 can be fixed (e.g., statically coupled) to the mounting mechanism 140 or relative to the detection mechanism 110, or actuate relative to the mounting mechanism 140 or detection mechanism 110. For example, the treatment mechanism 120 can rotate or translate relative to the detection mechanism 110 and/or mounting mechanism 140. In one variation, the system 100 includes an assembly of treatment mechanisms, wherein a treatment mechanism 120 (or subcomponent of the treatment mechanism 120) of the assembly is selected to apply the treatment to the identified plant 120 or portion of a plant in response to identification of the plant and the plant position relative to the assembly. In a second variation, the system 100 includes a single treatment mechanism, wherein the treatment mechanism is actuated or the system 100 moved to align the treatment mechanism 120 active area 122 with the targeted plant 102. In a third variation, the system 100 includes an array of treatment mechanisms 120, wherein the treatment mechanisms 120 are actuated or the system 100 is moved to align the treatment mechanism 120 active areas 122 with the targeted plant 102 or plant segment.

Figure 1C:
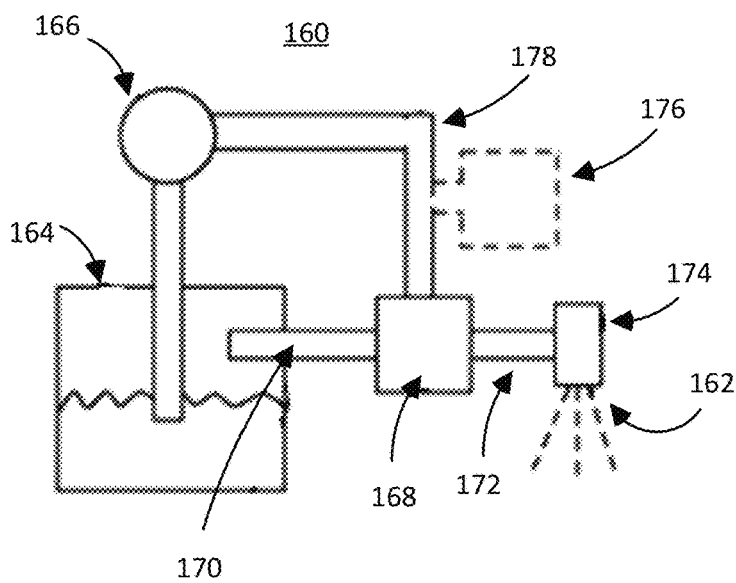

In one configuration, as shown in FIG. 1C, the treatment mechanism 120 can include a spray mechanism 160 wherein the active area includes a spray area. The spray mechanism functions to spray a high pressure jet or spray to apply a treatment to the active area 122, but can alternatively or additionally function to apply a force (e.g., a cutting force) to a portion of the plant (e.g., plant stem, leaf, branch, root, or any other suitable plant portion) or substrate, or function to treat the plant in any other suitable manner. The spray mechanism does not spray working fluid in the standby mode, and sprays a working fluid in the treatment mode. The working fluid can be water, fertilizer, growth hormone, or any other suitable fluid. The working fluid is emitted (e.g., sprayed) at a spray pressure of approximately 30 psi, within a margin of error (e.g., a 5% margin of error, 2% margin of error, etc.), but can alternatively be emitted at a pressure of 90 psi or at any other suitable pressure. The spray is emitted from the treatment mechanism 120 when positioned within several centimeters (e.g., 1cm, 5 cm, 10 cm, etc.) of the substrate 106 surface, but can alternatively be positioned a meter away from the substrate surface, 10 meters away from the substrate surface, or positioned any suitable distance away from the substrate surface.

The spray mechanism includes a nozzle 162. The nozzle 162 is oriented at a 90 degree angle relative to the substrate plane (e.g., pointing straight down at the substrate plane), but can alternatively be oriented at a 45 degree angle, 30 degree angle, 2 degree angle, or any other suitable angle relative to the substrate plane. The nozzle 162 can alternatively be actuatable relative to the mounting mechanism or detection mechanism. The nozzle 162 or its constituent components can be operable in any suitable number of modes to produce any number of spray patterns. Alternatively, different nozzles 162 may produce different spray patterns.

The spray pattern is a solid stream (e.g., solid cone), but can alternatively be a hollow cone, full cone, wide column, fan, flat spray, mist or any other suitable spray pattern for applying treatment fluid to plants 102 in a field. The nozzle 162 can be a single-fluid nozzle, but can alternatively be a multiple-fluid nozzle. The nozzle 162 can be a plain-orifice nozzle, a shaped-orifice nozzle, a surface-impingement single-fluid nozzle, a pressure-swirl single-fluid spray nozzle, a solid-cone single-fluid nozzle, a compound nozzle, an internal mix two-fluid nozzle, external-mix two-fluid nozzle, or any other suitable nozzle. The nozzle 162 can have a fixed exit or an actuatable exit such that the spray pattern is configurable. Nozzle emission (e.g., nozzle spray) is controlled by a valve assembly, but can alternatively be controlled by any other suitable control mechanism. The valve assembly controls the nozzle to open (e.g., spray) in response to receipt of a spray command from the control system 130, but can alternatively be passively or mechanically controlled. Detailed configurations of various example nozzles that may be used with the system 100 will be described in later sections.

The spray mechanism can additionally include a pressurization system 160, including a reservoir 164 and a pump 166. The spray mechanism can additionally include a bypass valve 168 fluidly connecting an intake 178 fluidly connected to the reservoir 164, a first outtake 170 fluidly connected to the reservoir 164, and a second outtake 172 fluidly connected to the nozzle 162. The bypass valve 168 is operable between a closed mode, wherein the bypass valve 168 fluidly disconnects the nozzle 162 from the reservoir 164, and an open mode, wherein the bypass valve 168 fluidly connects the nozzle 162 to the reservoir 164, more fluidly connects the intake with the nozzle 162. The bypass valve 168 can be passive, wherein the cracking pressure is the same as the desired spray pressure, or can be active, wherein bypass valve actuation from the closed to open mode is actively controlled, such as by the control system 130. The bypass valve 168 can fluidly disconnect (e.g., seal) the intake from the first outtake 170, or fluidly connect all three fluid manifolds. The pump 166 pressurizes the reservoir 164 to the spray pressure by pumping the working fluid into the intake, through the bypass valve 168, and through the first outtake 170 into the reservoir 164. The pump 166 can pressurize the reservoir 164 with secondary fluid from the ambient environment (e.g., from a fluid source or air), or pressurize the working fluid in the reservoir 164 in any other suitable manner. The bypass valve 168 opens in response to the intake fluid pressure meeting or exceeding the desired spray pressure, such that the intake is fluidly connected to the nozzle 162. In this variation, the treatment mechanism 120 can additionally include a pressure sensor or flow sensor that measures the fluid pressure or flowrate at the nozzle 162, intake, bypass valve 168, first outtake 170, second outtake 172, or reservoir 164, wherein the treatment parameters (e.g., initial spray time or position) can be subsequently adjusted or determined based on the measured working fluid parameters.

The spray mechanism can additionally or alternatively include a secondary reservoir 176 (e.g., accumulator) fluidly connected to the reservoir 164 and the nozzle 162, wherein the pump 166 pumps working fluid from the reservoir 164 to the accumulator 176. The accumulator 176 functions to retain a volume of working fluid sufficient to spray a predetermined number of plants. The accumulator 176 can additionally function to pressurize the fluid. The accumulator 176 fluidly connected to the reservoir 164 between the pump 166 and the nozzle 162. The spray mechanism can additionally include a valve that controls fluid flow between the accumulator 176 and the nozzle 162. When a bypass valve 168 is used, as in the variant described above, the accumulator 176 is fluidly connected to the intake between the pump 166 and the valve 168. The accumulator 176 is connected in parallel with the nozzle 162, but can alternatively be connected in series with the nozzle 162. The accumulator 176 can be additionally fluidly connected to a secondary working fluid reservoir, wherein metered amounts of secondary working fluid (e.g., fertilizer, growth hormone, etc.) can be provided to the accumulator 176 to mix with the primary working fluid (e.g., water) within the accumulator 176. However, the spray mechanism can include any other suitable components. The pressurization system 160 or any component or subsystem of the pressurization system may be incorporated by any other component of the system 100 to facilitate the treatment of plants in the field.

In one example configuration, the system 100 can additionally include a mounting mechanism 140 that functions to provide a mounting point for the system components. In one example, as shown in FIG. 1A, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In some configurations, there may be no mounting mechanism 140, or the mounting mechanism can be incorporated into any other component of the system 100.

In one example system 100, the system may also include a first set of coaxial wheels, each wheel of the set arranged along an opposing side of the mounting mechanism 140, and can additionally include a second set of coaxial wheels, wherein the rotational axis of the second set of wheels is parallel the rotational axis of the first set of wheels. However, the system can include any suitable number of wheels in any suitable configuration. The system 100 may also include a coupling mechanism 142, such as a hitch, that functions to removably or statically couple to a drive mechanism, such as a tractor, more to the rear of the drive mechanism (such that the system 100 is dragged behind the drive mechanism), but alternatively the front of the drive mechanism or to the side of the drive mechanism. Alternatively, the system 100 can include the drive mechanism (e.g., a motor and drive train coupled to the first and/or second set of wheels). In other example systems, the system may have any other means of traversing through the field.

In some example systems, the detection mechanism 110 can be mounted to the mounting mechanism 140, such that the detection mechanism 110 traverses over a geographic location before the treatment mechanism 120 traverses over the geographic location. In one variation of the system 100, the detection mechanism 110 is statically mounted to the mounting mechanism 140 proximal the treatment mechanism 120. In variants including a verification mechanism 150, the verification mechanism 150 is arranged distal the detection mechanism 110, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other systems, the detection mechanism 110 can be incorporated into any other component of the system 100.

In some configurations, the system 100 can additionally include a verification mechanism 150 that functions to record a measurement of the ambient environment of the system 100, which is used to verify or determine the extent of plant treatment. The verification mechanism 150 records a measurement of the geographic area previously measured by the detection mechanism 100. The verification mechanism 150 records a measurement of the geographic region encompassing the plant treated by the treatment mechanism 120. The verification mechanism measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or be different from the detection mechanism 110. The verification mechanism 150 can be a multispectral camera, a stereo camera, a CCD camera, a single lens camera, hyperspectral imaging system, LIDAR system (light detection and ranging system), dyanmometer, IR camera, thermal camera, humidity sensor, light sensor, temperature sensor, or any other suitable sensor. In other configurations of the system 100, the verification mechanism 150 can be included in other components of the system.

In some configurations, the system 100 can additionally include a power source, which functions to power the system components, including the detection mechanism 100, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the system 100.

In some configurations, the system 100 can additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

In the described system 100, the treatment mechanism 120 includes an array of manifolds, nozzles, and valve assemblies. Nozzles and valve assemblies of the treatment mechanism 120 spray a treatment fluid onto plants as the system passes over the plants in a field. Generally, the nozzles and valve assemblies can be grouped into any number of cassettes and groups of cassettes (or single cassettes) form a manifold. Multiple manifolds (or a single manifold) are configured into a manifold assembly and the manifold assembly is configurable such that the manifold assembly can be moved through a field to apply treatment to plants. While described in particular configurations and groupings, the groupings of nozzles, valve assemblies, cassettes, and manifolds can take any grouping or configuration such that the treatment mechanism 120 is able to apply treatment to plants in a field. Further, the treatment mechanism can also be configured without any of its constituent components or groupings (e.g. spray nozzles and valve assemblies may not grouped into a cassette, or a treatment mechanism that is a singular manifold and not a manifold assembly, etc. . . . ) such that the treatment mechanism is able to apply treatment to plants in a field.

II. Tube Manifold Assembly

The treatment mechanism 120 is a highly configurable component that can be configured to spray treatment fluid on various plants of different sizes and seed line spacing. In one embodiment, the treatment mechanism 120 is a tube manifold assembly 200 including tube manifolds 220 coupled to various types of spray nozzles 230. The tube manifolds 220 of the tube manifold assembly 200 can be configured for treatment of different plants 102 and active areas 122.

Figure 2A:
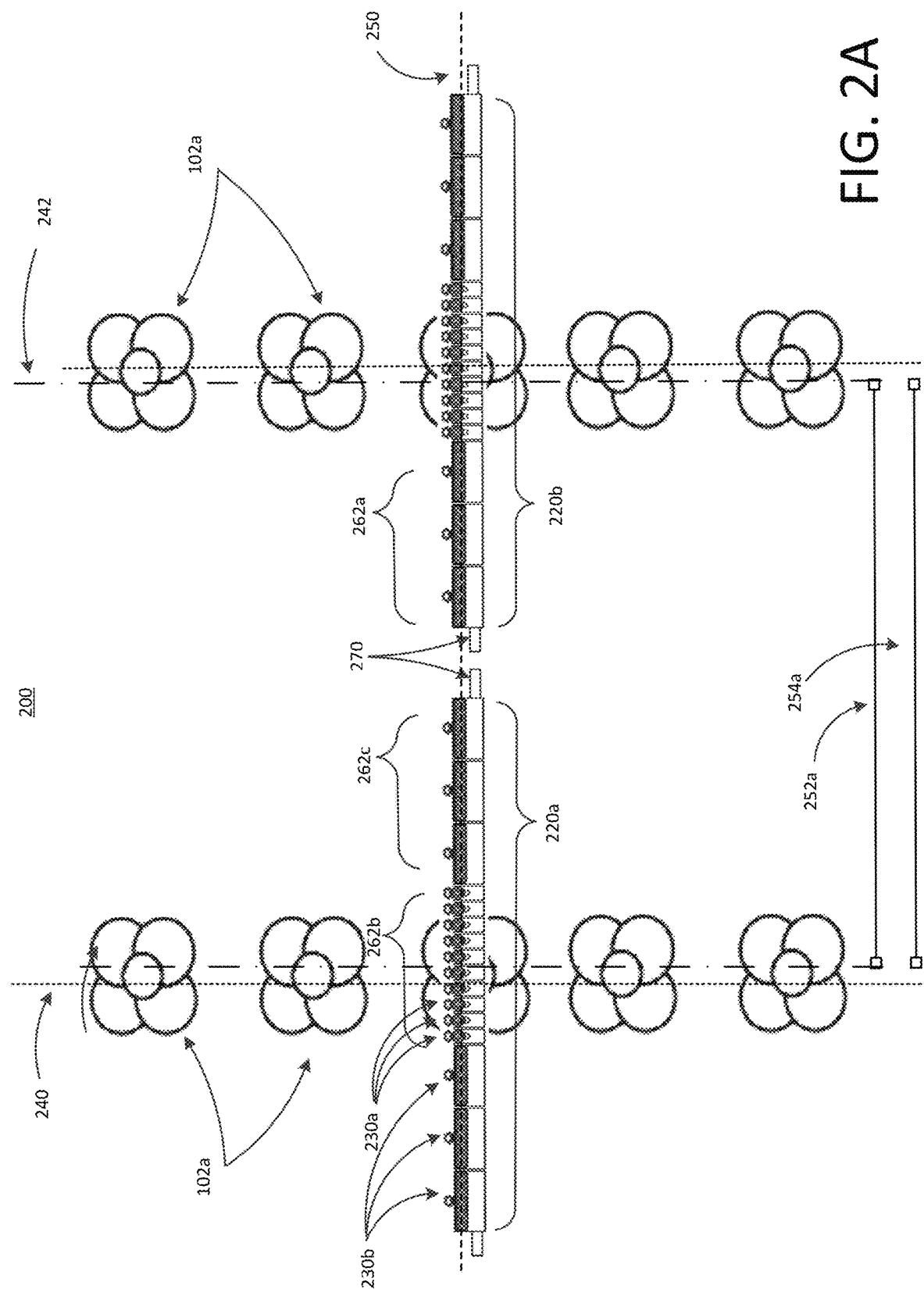

FIG. 2A illustrates a tube manifold assembly for use in the system 100, in one example embodiment. The tube manifold assembly 200 allows crop treatment fluid to be sprayed on a selected target plant or plant portion. Limiting spraying to a selected target increases the options for crop protectants for use by the system 100. For example, spraying a selected target but not nearby un-selected targets enables the successful weeding of non-GMO crops in a field which may not be herbicide resistant, and which would otherwise might be damaged or affected by less precise treatment mechanisms.

The tube manifold assembly 200 may include a set of tube manifolds 220 allowing multiple tube manifolds to apply treatments to crops 102 of multiple crop rows simultaneously. FIG. 2A shows an example of a tube manifold assembly 200 with two tube manifolds 220, each tube manifold with ten small nozzles 230a and two groups of three large nozzles 230b. Each tube manifold 220 of the tube manifold assembly moves 200 along a manifold path 240, the tube manifold path 240 parallel to the direction of travel of the system 100. The tube manifold paths 240 of the tube manifolds 220 are approximately parallel.

In the illustrated example embodiment, the ten nozzles 230a are coupled to the tube manifold as a middle cassette 262b and each group of large nozzles as a left cassette 262b and a right cassette 262c and are fluidically coupled to the manifold support structure 270. Generally, the tube manifolds 220 are oriented such that the nozzles 230 of each tube manifold 220 (and each cassette 262 of the tube manifold 220) approximate a tube nozzle axis 250 that is perpendicular to the tube manifold paths 240. Further, there is no overlap between nozzles 230 or cassettes 262 of adjacent tube manifolds 220 (e.g. 220a and 220b) in the tube manifold assembly 200 such that there is a manifold spacing 252 between the manifold paths 240.

In this configuration the system 100 moves forward such that the tube manifold paths 240 are approximately parallel to the seed lines 242 of the crops. While the tube manifold paths can take any alignment, in general, the system 100 moves such that the center of each tube manifold 220 passes over the approximate center of each plant 102 in a seed line 242. The tube nozzle row 250 is approximately perpendicular to the seed lines 242 of the crops. In the illustrated configuration, the tube manifolds 220 are oriented such that the manifold spacing 252a (e.g. the distance between adjacent tube manifold 220 centers) is approximately the crop row width 254a of the plants 102 (i.e. the spacing between adjacent seed lines 242).

Figure 2B:
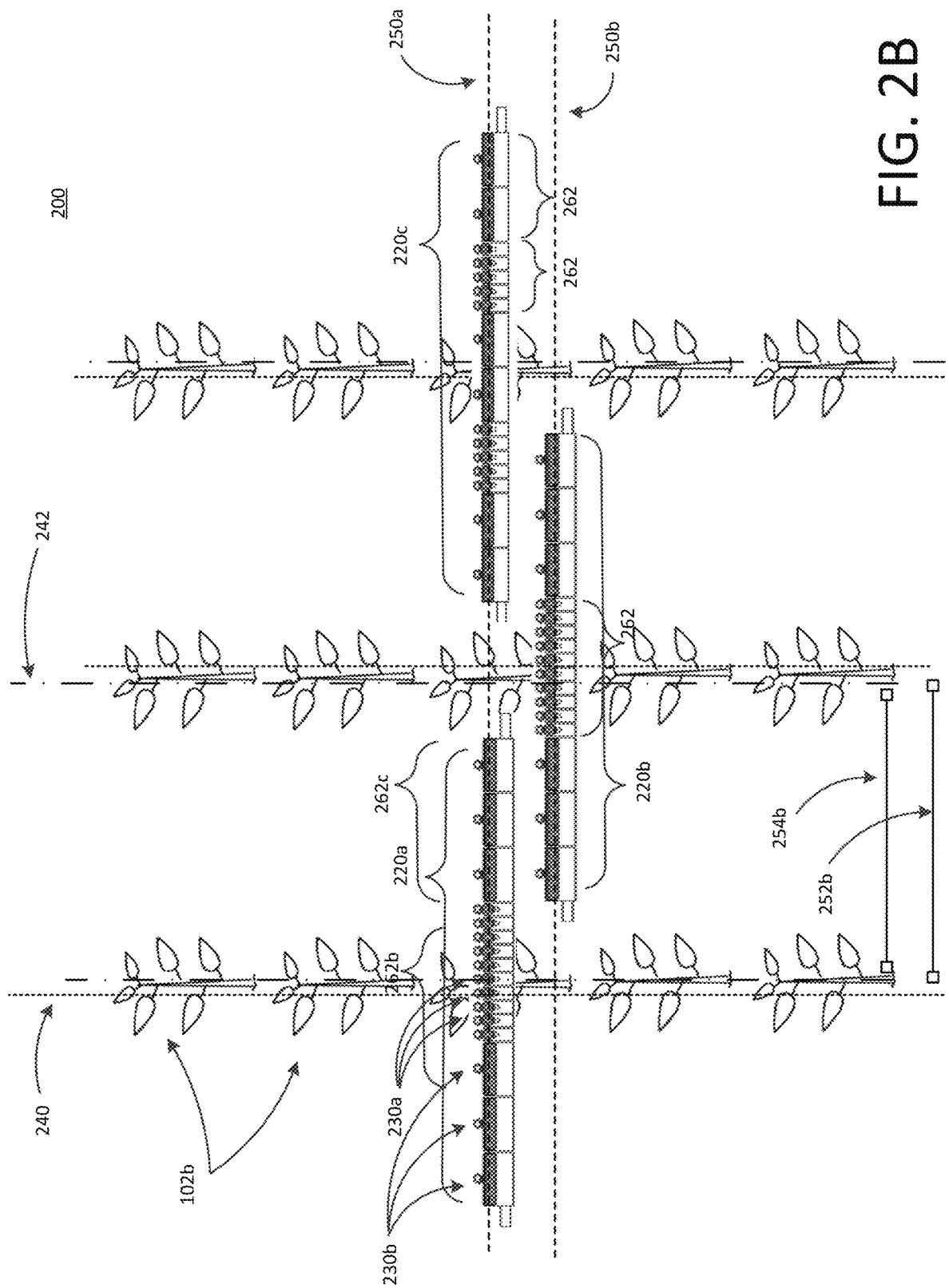

FIG. 2B shows an example of three tube manifolds 220 in a manifold assembly 200 substantially similar to the configuration of the manifold assembly of FIG. 2A (in an open configuration), but in a nested configuration. In the nested configuration the nozzles of the three tube manifolds each include a nozzle row (250a and 250b) that is perpendicular to the manifold path 240 of the tube manifolds 220. Further, the second tube manifold 220b of the tube manifold assembly 200 is offset such that the tube nozzle row 250b of the second tube manifold 220b is offset from the nozzle rows 250a of the first tube manifold 220a and third tube manifold 220c along the seed lines 240. Additionally, there is an overlap between nozzles 230 and cassettes 262 of adjacent tube manifolds 220 in the manifold assembly 200 such that there is a smaller tube manifold spacing 254 between the manifold paths 242 than if there was no overlap between adjacent nozzles 230 and cassettes 262. Finally, the third tube manifold 220c has a different configuration for the 10 small nozzles 230a and six large nozzles 230b in a tube manifold 220c. One skilled in the art will recognize that the number and orientation of the small nozzles 230a and the large nozzles 230b of a tube manifold 220 can be variable and that the nozzles maybe coupled to the manifold any number of cassettes 262. Additionally, one skilled in the art will recognize that the number and relative orientation of tube manifolds 220 and cassettes can be variable.

The crop 102 in the field of FIG. 2B is smaller than the crop of FIG. 2A and has a smaller crop row width 252. Similar to FIG. 2A, the system 100 moves forward such that the manifold paths 240 of the tube manifold assembly 200 are approximately parallel to the seed lines of the crops 242 and the center of each tube manifold 220 passes over the approximate center of each plant 102 with the nozzle rows 250a and 250b perpendicular to the manifold paths 240 and seed lines 242. Dissimilar to FIG. 2A, due to the overlap between nozzles of adjacent nesting manifolds 220 (e.g. 220a and 220b) in the configuration of FIG. 2B, the manifold spacing 252b is narrower than the manifold spacing 252a of FIG. 2A. The tube manifold assembly can apply treatment to crop row widths between 2' and 60."

In the illustrated examples of FIGS. 2A-2B, to allow the system to change between row widths (e.g. 254a to 254b), the tube manifold 220 can be physically mounted and configured relative to each other such that adjacent tube manifolds can nest for close spacing for narrower seed lines, or be expanded out for wider spaced seed lines. The tube manifolds 220 can be coupled to the tube manifold assembly 200 and the tube manifold assembly 200 can be configured to change the separation and nozzle overlap between adjacent tube manifolds 220, i.e. the degree of nesting. The tube manifold assembly 200 may include actuators coupled to the tube manifold assembly 200 and tube manifolds 220 to actuate the tube manifolds in to different positions. The actuators may be: motors, springs, levers, pistons, pulleys, gears, or any other component capable of mechanically changing the spacing of the tube manifolds 220. The tube manifold assembly 200 can be coupled to the mounting mechanism 140 and the control system 130 such that the system controller is able to control the actuators and change the spacing between tube manifolds 220. While FIGS. 2A-2B demonstrate either two or three tube manifolds in a tube manifold assembly, there may be any number of tube manifolds creating a tube manifold assembly. Additionally, any component of the system 100 can be configured with components to change the spacing between the tube manifolds 220.

III. Tube Manifold

The tube manifold 220 is a manifold of the tube manifold assembly 200 that is configured to apply treatment fluid to plants in a field as the tube manifold assembly passes over plants in a field. Each tube manifold assembly includes at least one manifold for applying treatment fluid to crops as the manifold assembly passes above plant material in the field. In the illustrated examples of FIGS. 2A-2B, the manifold can the tube manifold illustrated in FIGS. 2C-2E.

FIG. 2C illustrates a front isometric view of a tube manifold 260 with a left cassette 262a, a middle cassette 262b, and a right cassette 262c, according to one example embodiment. FIGS. 2D and 2E illustrate a front planar view of the middle cassette 262b and right cassette 262c of a tube manifold 260, respectively.

The tube manifold 260 can include a support structure 270, a reservoir (not pictured), a left cassette 262a, a middle cassette 262b, a right cassette 262c, treatment feed tubes 210, and nozzle control connectors 276. Each cassette includes an array of nozzles 230 and valve assemblies 278.

Each tube manifold 260 and its components may have a bottom side, a top side, a front side, a back side, a left side, and a right side. In the orientation of the configuration shown in FIG. 2C, the bottom is side facing to the bottom of the page the (e.g. towards the crops), the top side facing to the top of the page (e.g. away from the crops), the front side facing into the plane of the page (e.g. towards the front of the system and in the direction the system travels), the back side facing out of the plane of the page (e.g. to the back of the system 100), and the left side and ride side are referenced from the front facing side (e.g. the left side is facing the left side of the page, and the right side is facing the right side of the page in the orientation of FIG. 2C).

The support structure 270 is a structural support apparatus configured to mechanically support and couple other components of the tube manifold 260. In the illustrated example, the support structure 270 is a substantially cylindrical tube created from a mechanically rigid material such as aluminum, steel, plastic, or any other material that can be used to fabricate components for applying treatment fluid in a field. The support structure 270 contains a hollow cavity that allows treatment fluid to move along the axis of the support structure. The support structure 270 can be fluidically coupled to the reservoir by the treatment feed tubes 210. The axis of the support structure is parallel to the tube nozzle axis 250 and perpendicular to the seed lines 240.

In one example configuration, the front side of each cassette 262 may be coupled to the back side of the support structure 270 such that the back sides of the cassettes 262 are substantially flush. The bottom sides of each cassette 262 are substantially flush and are oriented such that the fluids exiting the nozzles 230 spray substantially downward towards the plants in the field. The center 280 of the tube manifold 220 approximately bisects the support structure 270, or alternatively is the approximate center of the tube manifold 220. The center 280 of the tube manifold 220 approximately follows the manifold path 240 in the direction of movement of the tube manifold assembly 200 and the system 100. One skilled in the art will recognize that the constituent components of the tube manifolds 260 can take any orientation or coupling such that the tube manifold is capable of assisting the treatment mechanism 120 in applying a treatment to a plant in the field.

The nozzles and cassettes of the tube manifold assembly can take any grouping such that different groupings of nozzles can spray treatment on the plants of the field at any time. For example, the back side of the right cassette 262c is coupled to the valve assemblies 278c and nozzles 230c of the right cassette. The nozzles 230c and valve assemblies 278c are grouped into a right sprayer group. The middle cassette and left cassette are similarly coupled and grouped into middle and left sprayer groups, respectively. The nozzles 230 and valve assemblies 278 of each sprayer group are adjacently oriented such that the nozzle exits are approximately linear. The nozzle exits of each sprayer group are collinear and additionally collinear to the tube nozzle row 250. Each sprayer group is configured such that individual nozzles of the sprayer group couple to the cassettes 262 and can be mechanically removed and replaced from the tube manifold 220.

In the illustrated configuration, the left 262a and right 262b cassettes include three wide nozzles 230b and their corresponding valve assemblies 278 with each trio of wide nozzles grouped into a left and right sprayer group, respectively. The middle cassette includes ten narrow nozzles 230a and their corresponding valve assemblies 278 grouped into the middle sprayer group. The wide nozzles 230b apply treatment fluid to a wider active area 122 than the narrow nozzles 230a.

In alternative embodiments, each sprayer group can be divided into nozzle subsets, e.g. in the middle sprayer group there may be a left subset of four nozzles, a middle subset of five nozzles, and a right subset of one nozzle. The nozzle subsets may take any number and any configuration, including nozzles of different sizes, e.g. a subset with one wide nozzle and one narrow nozzle. Further, each cassette is not limited to one sprayer group and may have any number of sprayer groups or nozzle subsets, e.g. the middle cassette may have two sprayer groups configured, each sprayer group divided into nozzle subsets. Additionally, a sprayer group may include nozzles from different cassettes. The spray of treatment fluid by each sprayer group and nozzle subset can be independently controlled by the system controller 130.

FIG. 2F illustrates a tube manifold that with a plurality of possible configurations. There tube manifold can include any number of cassette sizes coupling the nozzles to the support structure. The tube manifold can have any number of spray groups and nozzle subsets containing any number of nozzles across any number of cassettes, as described previously. For example, in one embodiment, all of the nozzles and valve assemblies may be coupled to the support structure via one cassette and all the nozzle and valve assemblies are grouped into a single sprayer group. In another example, every six adjacent nozzles are coupled to the support structure as a cassette, with each cassette having a two sprayer groups. Each sprayer group of each cassette is subdivided into two nozzle subsets, with the first nozzle subset having a singular nozzle and the second nozzle subset having a pair of nozzles.

The treatment feed tubes 210 fluidically couple the support structure 270 and valve assemblies 278 to the reservoir. In the illustrated embodiment, the treatment feed tubes 210 mechanically couple to the left and right side of the support structure 270. The treatment feed tubes 270 are constructed from plastic, aluminum, steel, or any other tubing material that can be used to fluidically couple components of the system 100.

The nozzle control connectors 276 electrically couple the valve assemblies and nozzles 230 of the tube manifold 260 to the system controller 130. The nozzle control connectors are configured to transmit and receive the control signals of each nozzle and valve assembly. The control signals dictate the release of treatment fluid as the tube manifold 260 passes above the plants as the system moves through a field.

IV. Offset Manifold Assembly

Figure 3A:
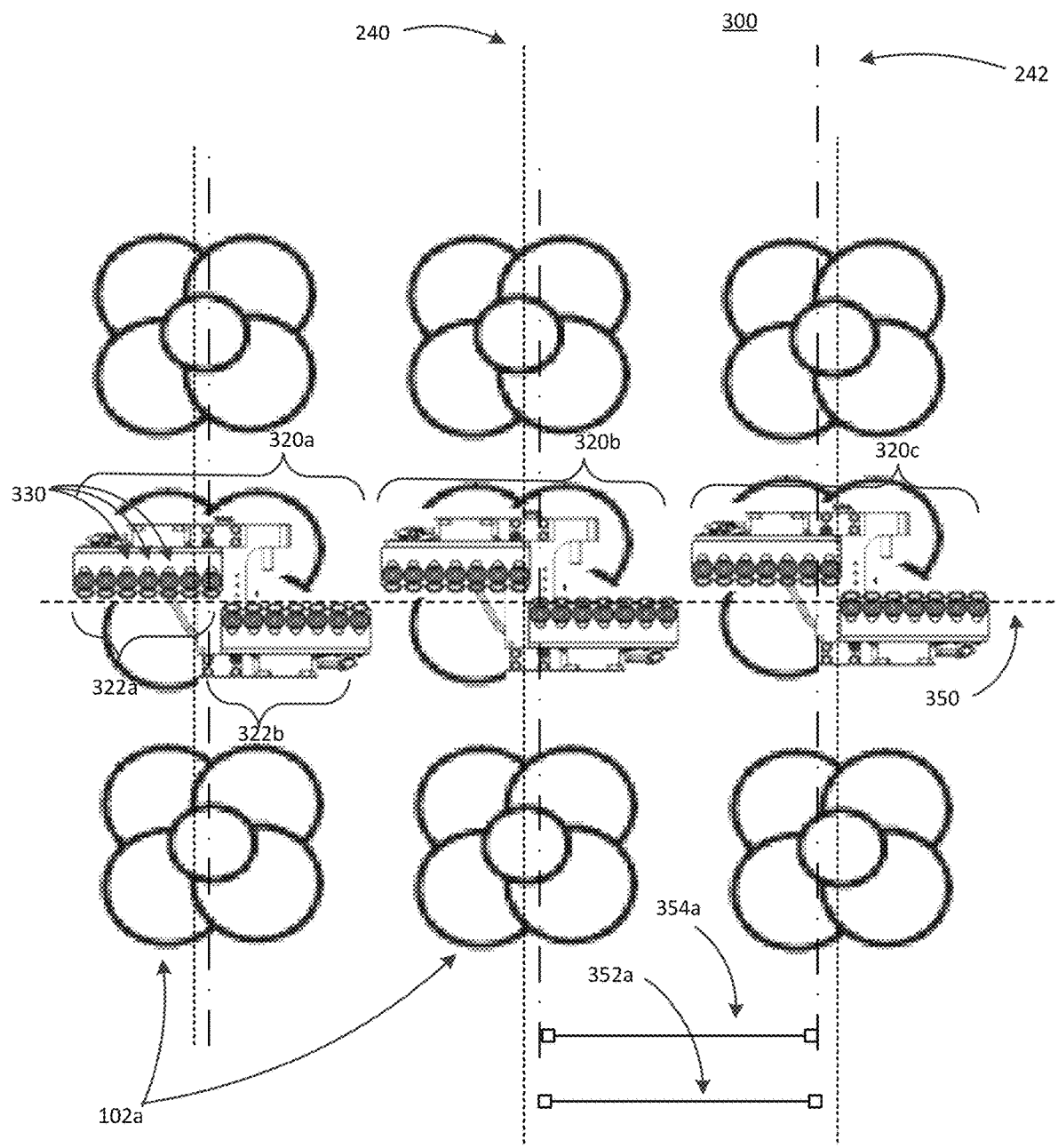
Figure 3B:
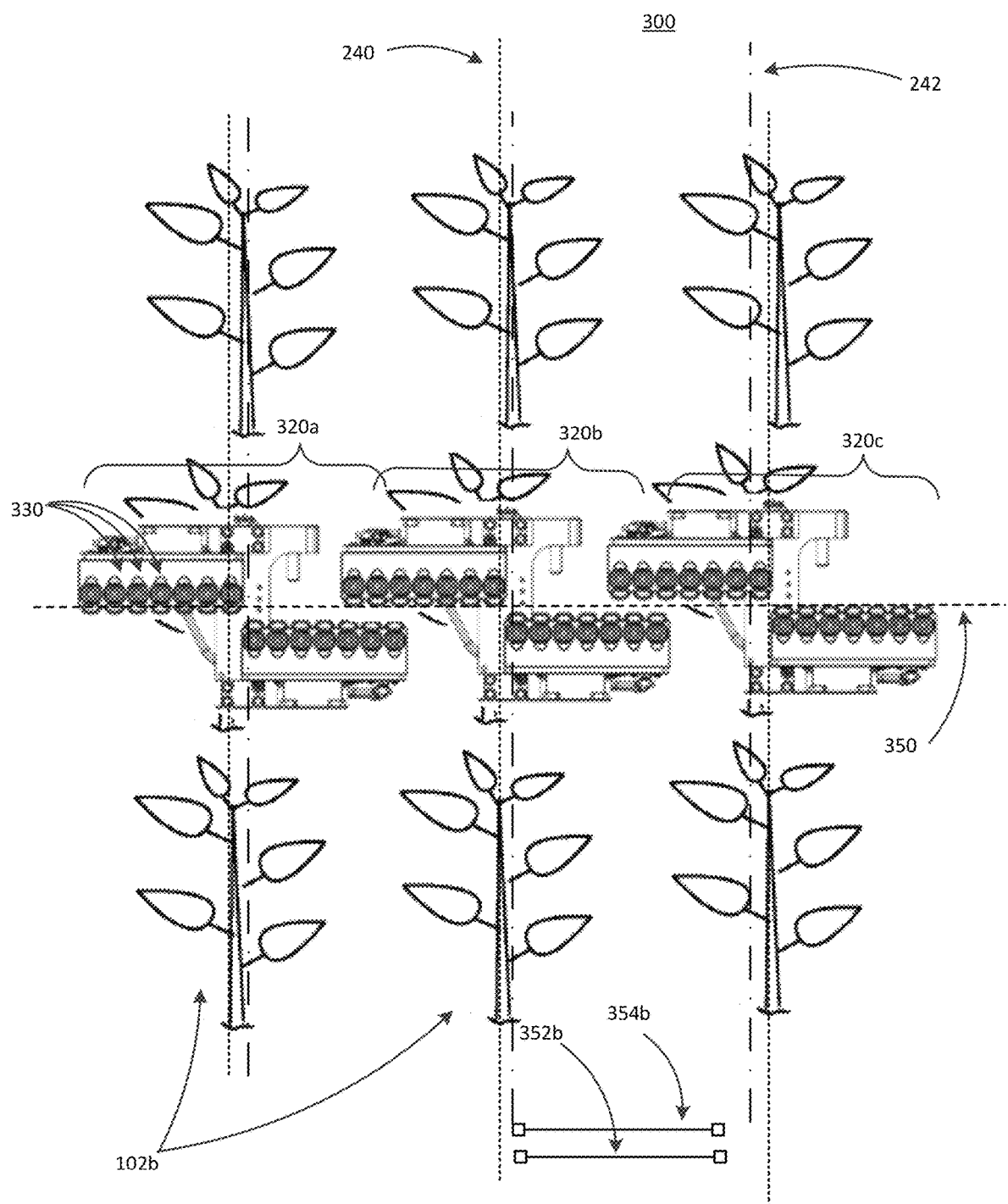

FIGS. 3A-3B illustrate another example treatment mechanism 120 for use in the system 100. The illustrated treatment mechanism is a configurable assembly consisting of an offset manifold assembly 300 including offset manifolds 320 coupled to spray nozzles 330. The offset manifolds 320 of the offset manifold assembly 300 can be configured for treatment of different plants 102 and active areas 122. Further, the offset manifold assembly 300 may configure the offset manifolds 310 to apply treatments to crops that have differences in seed line spacing.

FIG. 3A shows an example of a three offset manifolds 320 with fourteen nozzles 330 per offset manifold in an offset manifold assembly 300, configured in an open state. The offset manifold assembly 300 also allows crop treatment fluid to be sprayed on a selected target plant or plant portion.

The offset manifold assembly 300 of FIGS. 3A-3B function similarly to the tube manifold assembly 200 in FIGS. 2A-2B: each offset manifold 320 of the offset manifold assembly 300 moves along a manifold path 240, the manifold path 240 is parallel to the direction of travel of the system 100, the manifold path 240 is parallel to the seed lines 242 of the plants 102 in the field, the center of each offset manifold 320 passes over the approximate center of each plant 102, the offset nozzle row 350 is perpendicular to the manifold path 240 and seed lines 242, and the manifold spacing 352a is approximately equal to the crop row width 354a. Further, in the example of FIG. 3A there is no overlap between nozzles 330 of adjacent offset manifolds 320 (e.g. 320a and 320b) in the offset manifold assembly 300 such that there is a manifold spacing 352a between the manifold paths 240, while in the example of FIG. 3B there is overlap between nozzles of adjacent offset manifolds 320 such that manifold spacing 352b is the narrower than the manifold spacing 352a of FIG. 3A.

Also similarly to the tube manifold assembly 200 of FIGS. 2A-2B, the system 100 can be configured to change manifold spacing (e.g. 352a to 352b), i.e. the offset manifolds 300 are shaped such that adjacent offset manifolds can have variable spacing and overlap of nozzles 330 and cassettes 332 depending on the configuration of the system 100 (e.g. nest). In further similarity, the offset manifolds 320 and offset manifold assembly 300 can have any number of components or may be coupled to other components of the system 100 that allow for configuring the manifold spacing 352.

Dissimilar to the configuration of the tube manifold assembly 200 of FIGS. 2A and 2B, each offset manifold 320 has a left cassette 322a coupled to a left sprayer group and a right cassette 322b coupled to a right sprayer group. The left cassette 322a and the right cassette 322b group are approximately parallel to, and equidistant from, an offset nozzle row 350 which lies between the two cassettes. The configurations of the offset manifolds 320 are described in more detail below.

While FIGS. 3A-3B demonstrate three offset manifolds 320 in an offset manifold assembly 300, there may be any number of offset manifolds creating an offset manifold assembly. In the illustrated manifold assembly of FIG. 3A-3B each of the offset manifolds are collinear but the offset manifolds may be offset from one another such that the offset nozzle row 350 of each offset manifolds 320 are not collinear.

V. Offset Manifold

The offset manifold 320 is a manifold of the tube manifold assembly 300 that is configured to apply treatment fluid to plants in a field as the tube manifold assembly passes over plants in a field. Each offset manifold assembly includes at least one offset manifold for applying treatment fluid to crops as the manifold assembly passes above plant material in the field. In the illustrated examples of FIGS. 3A-3B, the manifold is the offset manifold illustrated in FIGS. 3C-2D.

Figure 3C:
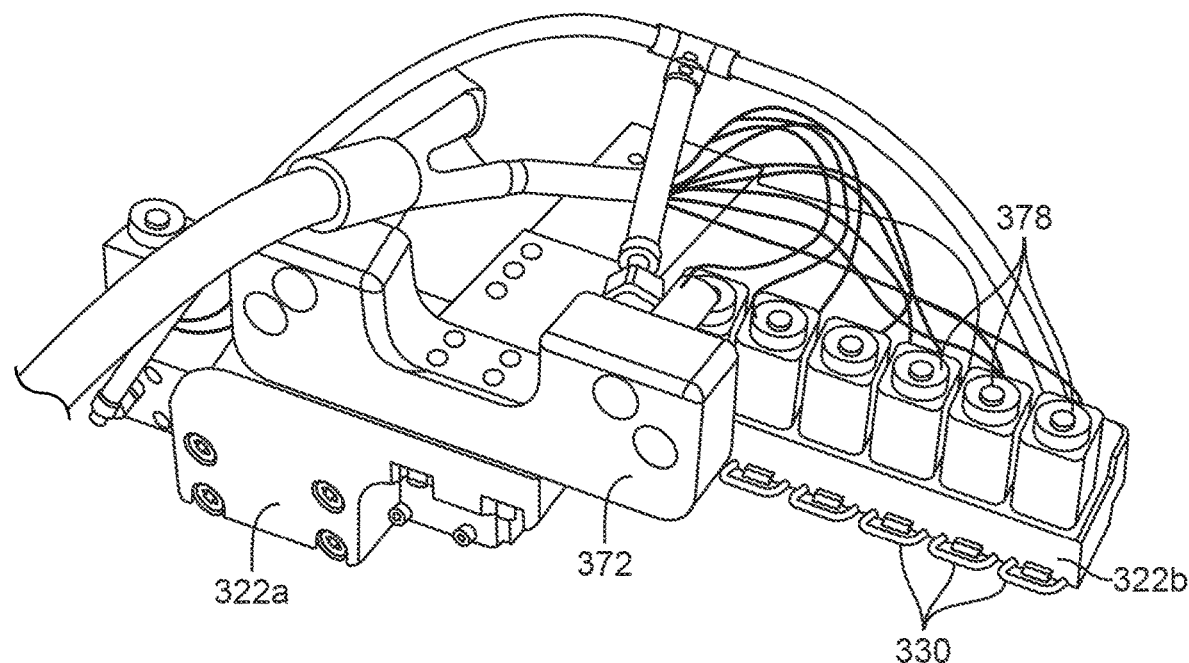
Figure 3D:
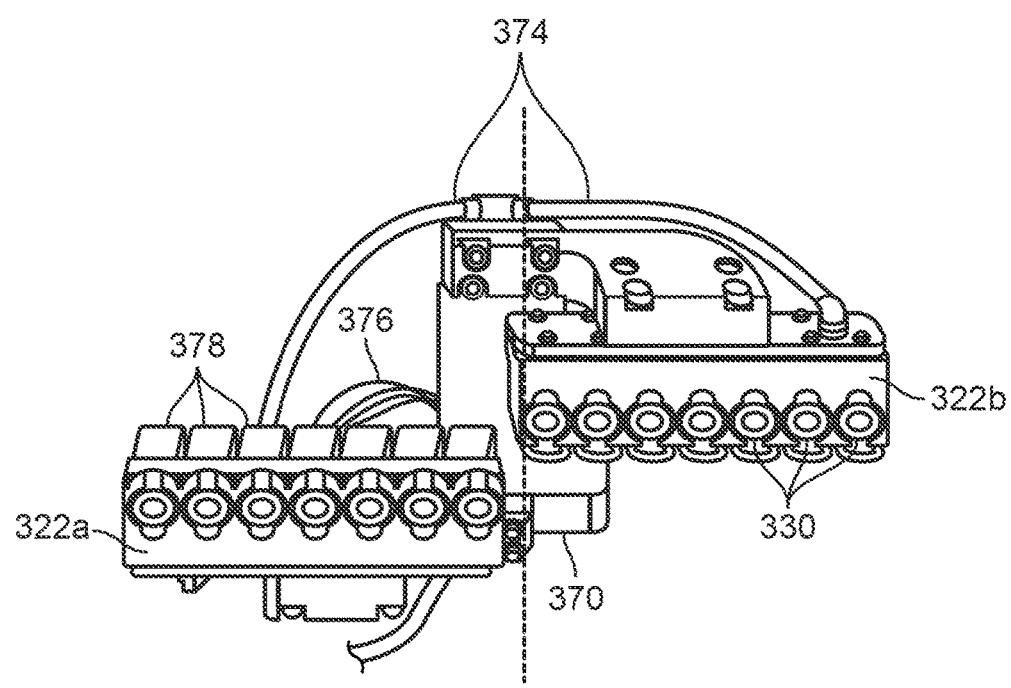

FIG. 3C-3D illustrate an individual offset manifold 320, according to one example embodiment. FIG. 3C gives an isometric view of the offset manifold, while FIG. 3D gives a planar view of the bottom of the offset manifold. The offset manifold includes a support structure 370, a reservoir 372, a left cassette 322a, a right cassette 322b, treatment feed tubes 374, and nozzle control connectors 376. Each cassette includes an array of nozzles 330 and valve assemblies 378.

Each offset manifold 320 and its components can have a bottom side, a top side, a front side, a back side, a left side, and a right side. In the orientation of the configuration shown in FIG. 3C, the bottom is side facing to the bottom of the page the (e.g. towards the crops), the top side facing to the top of the page (e.g. away from the crops), the front side facing into the plane of the page (e.g. towards the front of the system and in the direction the system travels), the back side facing out of the plane of the page (e.g. to the back of the system), and the left side and ride side are referenced from the front facing side (e.g. the left side is facing the left side of the page, and the right side is facing the right side of the page in the orientation of FIG. 3C).

In the illustrated example configuration, the support structure 370 is a structural support apparatus configured to mechanically support and couple all other components of the offset manifold 320. In one embodiment, the support structure 370 is a substantially rectangular block created from a mechanically rigid material such as aluminum, steel, plastic, or any other material that can be used to fabricate plant treatment systems.

In the illustrated example configuration, the bottom side of the reservoir 372 is coupled to the top side of the support structure 370. The reservoir 370 is positioned towards the back side of the offset manifold 320 such that back side of the reservoir 372 and the support structure are substantially flush. In other configurations the reservoir 370 may be coupled to any other portion of the offset manifold 320, the offset manifold assembly 300, or the system 100.

In the illustrated example configuration, the top side of the right cassette 322*b* is coupled to the bottom side of the support structure 370*a* such that the front side of the right cassette 322*b* and the support structure 370 are substantially flush. The top side of the left cassette 322*a* is coupled to the bottom side of the support structure 370 such that the back side of the left cassette 322*a* and the support structure 370 are substantially flush. The center 380 of the offset manifold runs from the back side to the front side of the offset support structure between the left cassette and the right cassette and. The center 380 of the offset manifold 320 approximately follows the manifold path 240 in the direction of movement of the offset manifold assembly 300 and the system 100. One skilled in the art the In the illustrated example configuration, the back side of the right cassette 322*b* is coupled to the valve assemblies 378 and nozzles 330 of the right cassette in a right sprayer group and the front side of the left cassette is coupled to the valve assemblies and nozzles of the left cassette in a left sprayer group. The nozzles and valve assemblies of each sprayer group are adjacently oriented such that the nozzles are approximately linear. The line of the left sprayer group is parallel to the line of the right sprayer group such that the lines are slightly separated and the offset nozzle row is approximately between the two. The left side of the right sprayer group is approximately flush with the midline and the right side of the left sprayer group is approximately flush with the midline. The sprayer groups are configured such that individual nozzles of the sprayer groups couple to the cassettes and can be mechanically removed and replaced. Further, the sprayer groups can be subdivided into any number of nozzle subsets. The nozzles, valve assemblies, sprayer groups, cassettes, and nozzles subsets can take any configuration to facilitate control of spraying treatment on the plants of the field, similar as previously described.

The treatment feed tubes 374 fluidically couple the valve assemblies 378 coupled to the left cassette 322a and the valve assemblies 378 coupled to the right cassette 322b to the reservoir 164. The treatment feed tubes 374 are constructed from plastic, aluminum, steel, or any other tubing material that can be used to fluidically couple components of the system.

The nozzle control connectors 376 electrically couple the valve assemblies 378 and nozzles 330 to the system controller. The nozzle control connectors 376 are configured to transmit and receive the control signals of each nozzle 330 and valve assembly 378. The control signals dictate release of treatments as the offset manifold 320 passes above crops as the system 100 moves through a field.

VI. Valve Assemblies

Figure 4A:
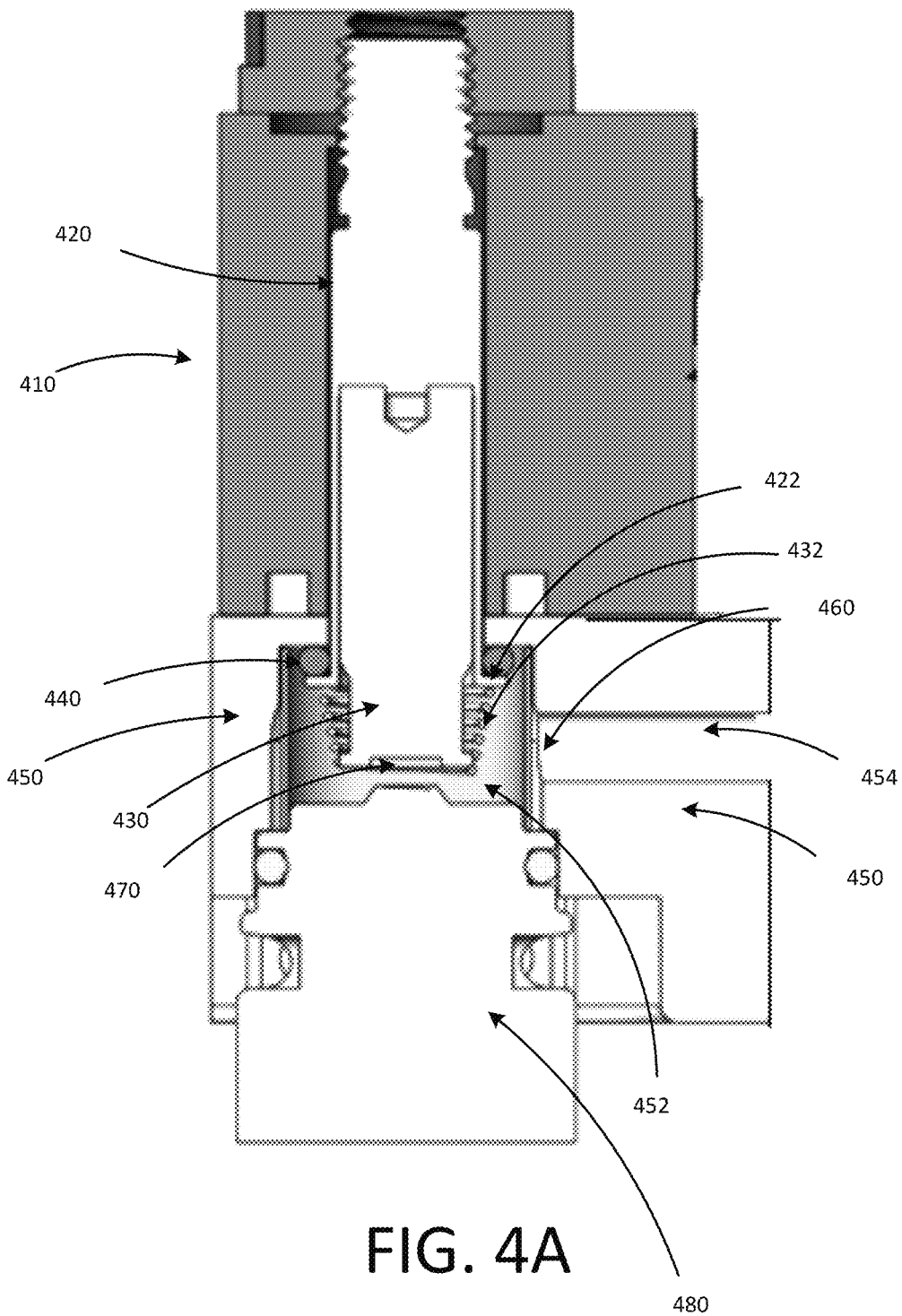
FIG. 4A illustrates a cross-sectional view of a valve assembly, in one example embodiment.

Each manifold includes at least one nozzle coupled to at least one valve assembly. FIG. 4A shows a cross-sectional view of a valve assembly used 400 in a plant treatment system, according to one example embodiment. The valve assembly 400 is designed such that a volume of fluid between the bottom of the spring plunger and the top of the nozzle is as small as possible. The reduced volume of liquid allows a full spray to develop and shut off nearly instantaneously. The nozzle sprays fluid downwards towards the crops along a spray axis (generally parallel or collinear to the nozzle midline) when the valve assembly forces fluid into the nozzle via the solenoid. Shutting of the flow of fluid through the nozzle is accomplished by having the nozzle itself positioned where the spring plunger seals off the flow. The valve assembly can be coupled to the system controller by nozzle control connectors to control the spraying of treatment fluid onto the crops.

Each of the valve assemblies 400 comprise a solenoid 410, an armature tube 420, a spring plunger 430, a valve O-ring 440, a valve body 450, a screen filter 460, and a rubber seal 470 and is mechanically coupled to a nozzle 480. The valve assembly and constituent components have a top side (e.g. to the top of the page in the orientation of FIG. 4A), a bottom side (e.g. to the bottom of the page in the orientation of FIG. 4A), a proximal side (facing towards the spray axis), a distal side (facing away from the spray axis), and are substantially oriented about the spray axis 480. The nozzle 480 may be any nozzle configuration described below.

The solenoid 410 is a solenoid coil configured to electromagnetically control the fluid exiting the nozzle assembly by manipulating the spring plunger 430 by converting control signals from the system controller 130 into mechanical motion of the solenoid 410. The solenoid 410 is configured such that the proximal facing solenoid 410 sidewalls are coupled to the distal facing armature tube 420 sidewalls. The bottom side of the solenoid 410 is coupled to the top side of the valve body 450 and near the top side of the armature tube 420 such that some portion of the armature tube 420 sidewalls extend past the bottom side of the solenoid 410 and into the valve body 450.

The armature tube 420 is a cylindrical tube coaxial to the spray axis 480 with the bottom side of the armature tube 420 including armature winglets 422. The armature winglets 422 extend radially outward from the spray axis on the bottom side of the armature tube. The proximal facing sidewalls of the armature tube 420 are coupled to the distal facing sidewalls of the spring plunger 430. A top portion of the distal facing sidewalls of the armature tube 420 are coupled to the solenoid 410 and a bottom portion of the distal facing sidewalls are coupled to the upper O-ring 440. The armature tube couples the solenoid 410 to the spring plunger 430 such that the solenoid is able to electromagnetically control the spray of the nozzle via the spring plunger 430.

The valve O-ring 440 is a mechanical gasket in the shape of a torus configured to be seated between the top side of the armature tube winglets 422 and the top side of the valve body 450. The valve O-ring 440 is compressed during assembly of the valve assembly 400 between the armature tube winglets 422 and the valve body 450 such that a fluid tight seal is created.

The spring plunger 430 is a substantially cylindrical in shape and is centered about the spray axis 480. An upper portion of the distal facing sidewalls of the spring plunger 480 are coupled to the proximal facing sidewalls armature tube 420. A lower portion of the distal facing sidewalls of the spring plunger are coupled to the spring coils 432. The bottom side of the spring plunger 430 is coupled to a rubber seal 470. The spring plunger 430 is configured to be controlled by the solenoid as the spring plunger moves up and down the spray axis 480. When the spring plunger 430 is moved upwards along the spray axis 480 by the solenoid 410 the spring plunger 430 removes the rubber seal 470 from the nozzle and allows fluid to begin to fill the nozzle. When the spring plunger is moved downwards along the spray axis by the solenoid the spring plunger a volume of fluid is pushed into the nozzle 490 for the nozzle to spray on the plants of the field. The spring plunger 430 is left in a downward position with the rubber seal 470 contacting the nozzle to prevent fluid from entering the nozzle for spraying.

The valve body 450 is configured to couple the components of the valve assembly to the manifold support structure and fluidically couple the reservoir 164 to the valve assembly 400. The valve body 450 includes a valve body cavity 452 and a fluid inlet cavity 454. The proximal facing sidewalls of the valve body cavity 452 are configured to act as a seat for the nozzle 480 when the nozzle is coupled to the valve assembly 400. The fluid inlet cavity 454 is a cavity within the valve body configured to fluidically couple the reservoir 164 to the valve body cavity 452. The valve body cavity 452 may fill with fluid when fluidically coupled to the reservoir 164 via the fluid inlet cavity 454 such that the treatment fluid can be injected into the nozzle 480.

The screen filter 460 is a filter coupled to the valve body 450 and valve body cavity 452, configured to filter particulates from the treatment fluid before the treatment fluid can enter the nozzle. The screen filter 460 is oriented such that it separates the fluid inlet cavity 454 from the valve body cavity 452 and filters out particulates from the treatment fluid as the treatment fluid moves from the fluid inlet cavity 454 to the valve body cavity 452. Filtering particulates from the treatment fluid can prevent the nozzle 480 from clogging during operation of the system 100.

FIG. 4B illustrates a tube valve assembly configured to couple to the support structure of the tube manifold of FIGS. 2C-2F. The tube valve assembly 402 is configured to mechanically and fluidically couple to a cylindrical support structure. The tube valve assembly can include any components that can mechanically couple the valve assembly to the support structure of a manifold including a latch 482, screws 484, clamps, locks 486, etc. The tube valve assembly can also include any components that can fluidically couple the valve assembly to the reservoir 164 such as tubing, piping, O-rings 488, gaskets, etc. The tube manifold fluidically couples the reservoir 164 to the fluid cavity inlet. In other configurations, the tube valve assembly can include additional support structures to couple adjacent tube valve assemblies into a cassette of the tube manifold. In some embodiments, a singular tube valve assembly may be a cassette of the tube manifold.

Figure 4B:
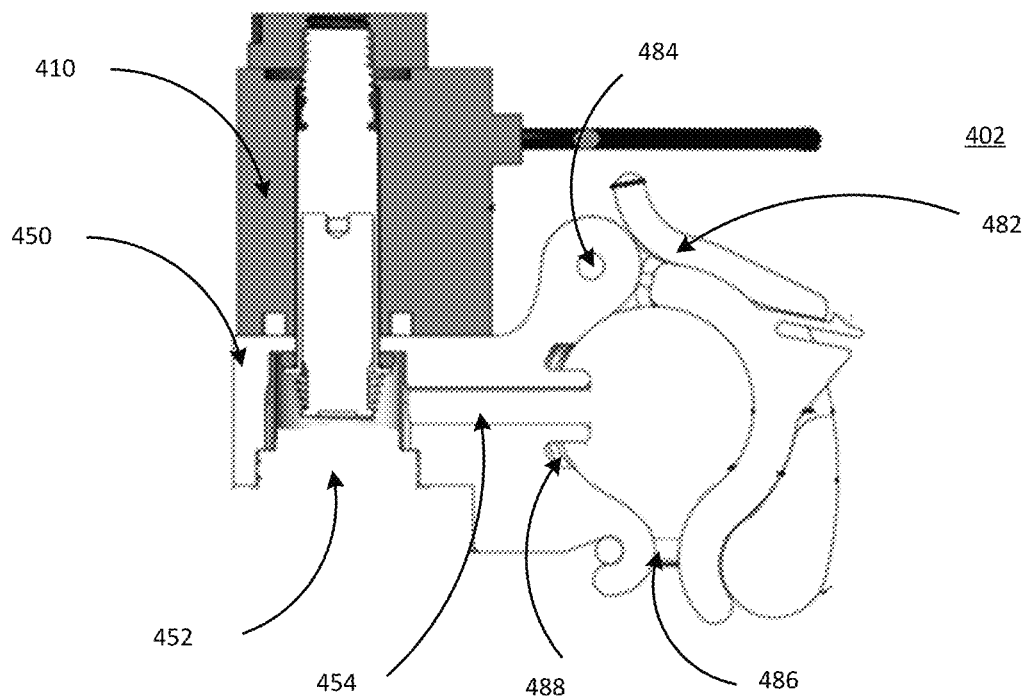
FIG. 4B illustrates a cross-section view of a valve assembly configured to couple to a tube manifold, in one example embodiment.
Figure 4C:
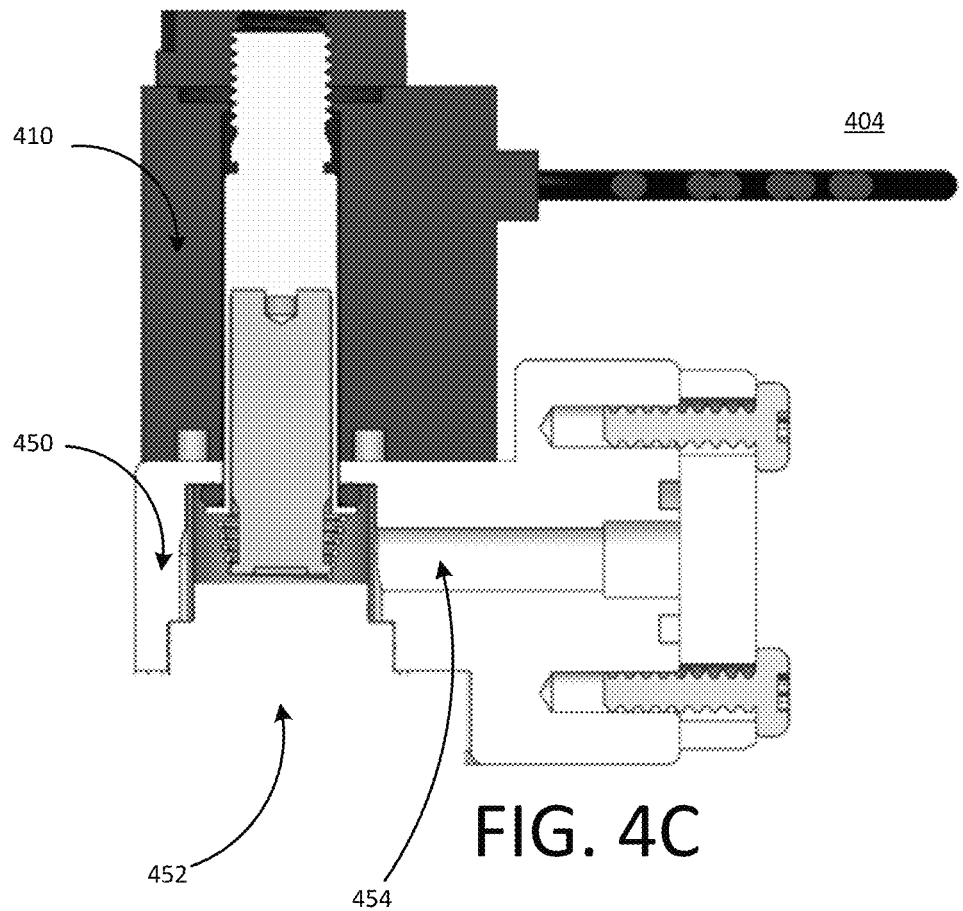
FIG. 4C illustrates a cross-section view of a valve assembly configured to couple to an offset manifold, in one example embodiment.

FIG. 4C illustrates an offset valve assembly configured to couple to the support structure of the offset manifold of FIGS. 3C-3D. The offset valve assembly 404 functions similarly to the tube valve assembly, but is configured to mechanically and fluidically couple to a substantially rectangular support structure. The offset valve assembly can include similar components to the tube valve assembly for coupling adjacent offset valve assemblies and fluidically coupling the valve assemblies to the reservoir.

VII. Tri-Spray Nozzles

The tri-spray nozzle is a nozzle configured to mechanically and fluidically couple to any of the described valve assemblies and treatment mechanisms. The tri-spray nozzle 500 is designed such that the spray pattern of treatment fluid exiting the tri-spray nozzle approximates a circular area when sprayed by the system 100 on crops in a field. The nozzle sprays treatment fluid downwards towards the crops along a spray axis coaxial to the midline. Shutting off the flow of fluid through the nozzle is accomplished by having the nozzle itself positioned where the spring plunger seals off the flow. The reduced volume of liquid between the spring plunger and the nozzle allows a full spray to develop and shut off nearly instantaneously.

Figure 5A:
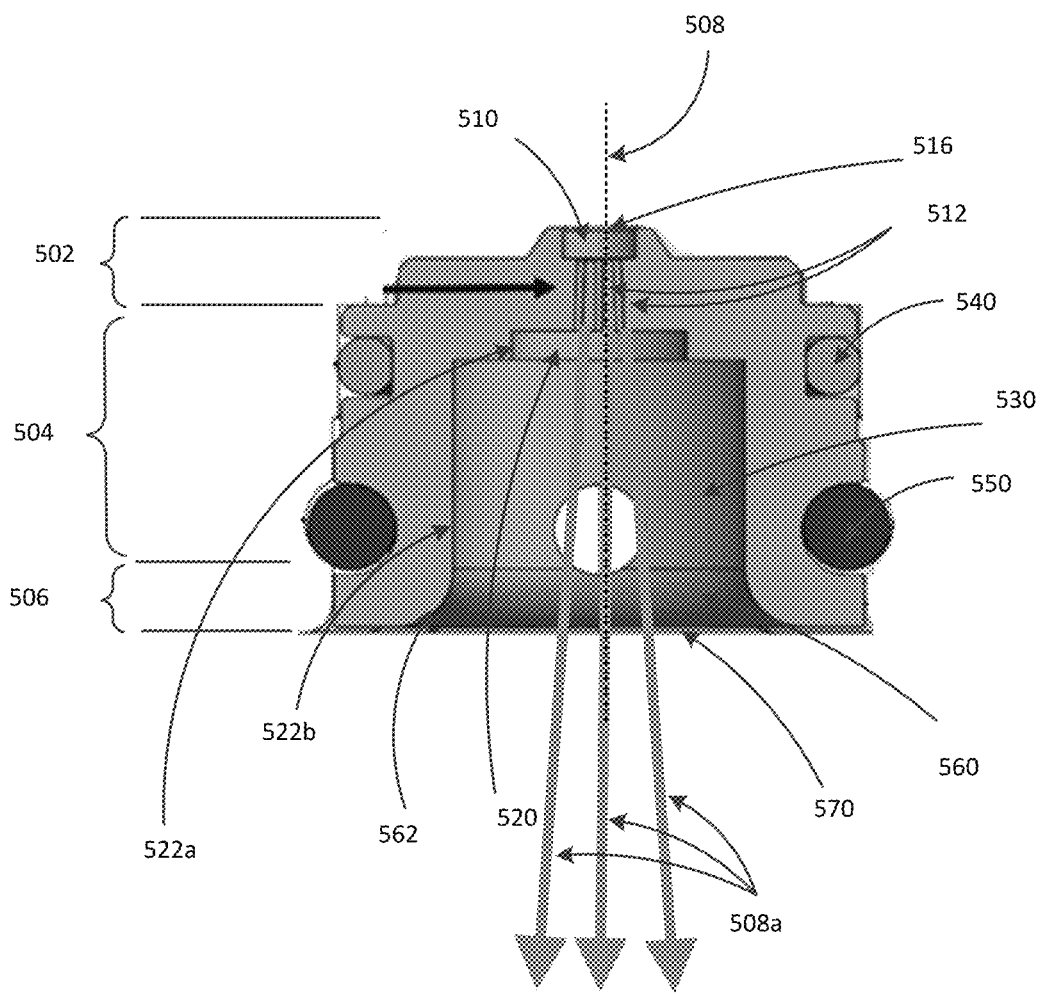
FIG. 5A illustrates a cross-section view of a tri-flow nozzle, in one example embodiment.

FIG. 5A shows a cross-sectional view of a tri-spray nozzle used by the system from the front side, according to one embodiment. The tri-spray nozzle 500 can be described in three sections: the nozzle head 502, the nozzle body 504, and the nozzle tail 506. Additionally, the tri-spray nozzle and its constituent sections and components have a top side (e.g. to the top of the page in the orientation of FIG. 5A), a bottom side (e.g. to the bottom of the page in the orientation of FIG. 5A), a front side (e.g. out of the page in the orientation of FIG. 5A), a back side (e.g. in to the page in the orientation of FIG. 5A), a distal side (e.g. away from the nozzle midline 508), and a proximal side (e.g. towards the nozzle midline 508).

The nozzle head 502 is shaped as a cylindrical annulus with a cavity centered about the nozzle midline 508 coupled to the bottom side of a cylindrical pyramid with a top flat surface and a central cavity centered about the nozzle midline 508. The proximal facing sidewalls of the cylindrical pyramid and cylindrical annulus cavities are coaxially centered about the nozzle midline 508 and form at least some portion of the inlet cavity 510. The top side of the nozzle head 502 can mechanically couple with the bottom of the spring plunger and rubber seal of the valve assembly (not shown). The top side nozzle head 502 includes a nozzle inlet 516 which can fluidically couple the inlet cavity 510 with the valve assembly when the solenoid of the valve assembly mechanically decouples the spring plunger and rubber seal from the top side of the nozzle head 502. The bottom side of the inlet cavity 510 is coupled to three inlet cavity bores 512.

The inlet cavity bores 512 are channels through the nozzle head 502 to the nozzle body 504 which couple the inlet cavity 510 to the inner cavity 512. The center inlet cavity bore is coaxial with the nozzle midline 508. The outer inlet cavity bores are angled away from the spray axis from their top side to their bottom side at a 3° angle. In the illustrated configuration, the inlet cavity bores are oriented such that the treatment fluid diverges away from the midline of the nozzle 508a when the treatment fluid is sprayed. Further, when then treatment fluid interacts with the plants it approximates a circular spot. In alternate embodiments, there may be any number of inlet cavity bores 512, and each of the inlet cavity bores 512 can take any angle relative to the midline 508 of the tri-spray nozzle 500 such that the treatment fluid moves substantially downwards towards the crops when the fluid is sprayed by the nozzle 500. Varying the angle and number of inlet cavity bores can be used to configure the size and shape of the nozzle spray pattern.

The nozzle body 504 is coupled to the bottom side of the nozzle head 502. The nozzle body 504 is substantially shaped as a cylindrical annulus with the proximal facing sidewalls of the cylindrical annulus centered about the nozzle midline 508 and forming at least some portion of the inner cavity 520 and the outer cavity 530. An upper portion of the proximal facing sidewalls 522a of the nozzle body form the inner cavity 520 and a bottom portion of the proximal facing sidewalls 522b of the nozzle body form the outer cavity 530. In the illustrated configuration, the inner cavity 520 has a smaller volume than the outer cavity 530. The distal facing sidewalls of the nozzle body 504 can be configured with any number of ridges or grooves to assist in mechanically coupling other components of the tri-spray nozzle 500 to the nozzle body 504. The inner cavity 520 is fluidically coupled to the nozzle inlet cavity 510 via the nozzle inlet bores 512. Further, the outer cavity 530 is fluidically coupled to the inner cavity 520.

In the illustrated embodiment, near the top side of the nozzle body 504 is a groove configured for mechanically coupling the tri-spray nozzle O-ring 540 to the nozzle body 504. The tri-spray nozzle O-ring 540 is a mechanical gasket in the shape of a torus configured to be seated between the distal facing sidewalls of the nozzle body 504 and the proximal facing sidewalls of the fill cavity 452 of the valve assembly 400. The tri-spray nozzle O-ring 540 is compressed during the mechanical coupling of the tri-spray nozzle 500 and the valve assembly 400 such that a fluid tight seal is created.

In the illustrated embodiment, near the bottom side of the nozzle body 504 is a groove on the distal facing sidewalls of the nozzle body 504 configured for mechanically coupling the tri-spray nozzle 500 to a pull-tab 550. The pull tab 550 is configured to allow an operator of the system to remove the tri-spray nozzle from the valve assembly 400 and treatment mechanism 120. The pull tab 550 can be any mechanical component such as a pull-ring, a latch, a handle, a knob, a ridge, or any other mechanical component that allows the removal of the nozzle from the valve assembly.

The bottom side of the nozzle body 504 is coupled to the top side of nozzle tail 506. The nozzle tail 506 is substantially shaped as a cylindrical annulus with the proximal facing sidewalls of the cylindrical annulus centered about the nozzle midline 508 and forming at least some portion of the exit cavity 560. The exit cavity sidewalls 562 taper away from the nozzle midline 508 towards the bottom of the nozzle tail 506 and form an opening that is the nozzle exit. The exit cavity 560 fluidically couples to the outer cavity 530 such that spray moving downwards through the nozzle body 504 via the inner cavity 520, nozzle bores 512, and nozzle inlet cavity 510, can exit through the nozzle exit 570.

Figure 5B:
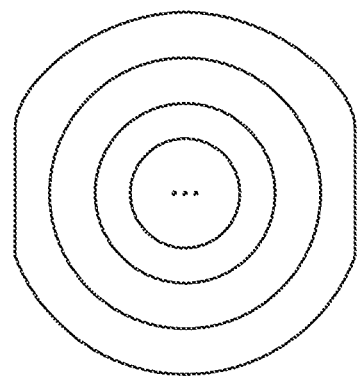
FIG. 5B illustrates a bottom planar view of a tri-spray nozzle, in one example embodiment.
Figure 5C:
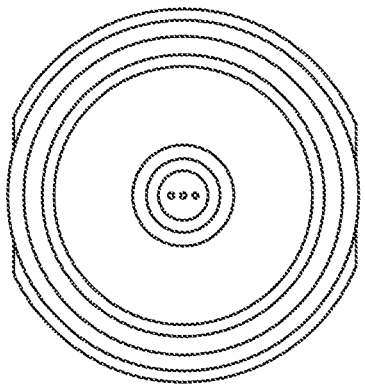
FIG. 5C illustrates a top planar view of a tri-spray nozzle, in one example embodiment.
Figure 5D:
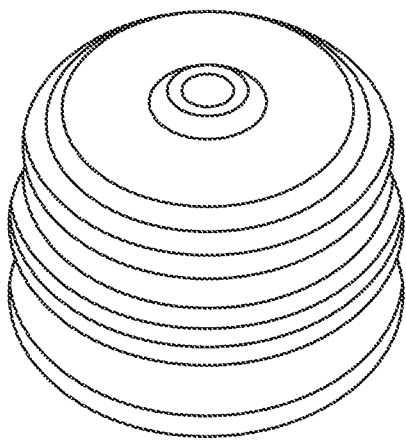
FIG. 5D illustrates an isometric view of a tri-spray nozzle, in one example embodiment.
Figure 5E:
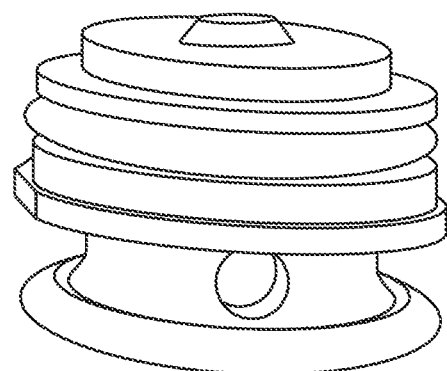
FIG. 5E illustrates a side view of a tri-spray nozzle, in one example embodiment.

FIGS. 5B-5E show illustrations of the tri-spray nozzles from different viewpoints with the pull tab removed, according to one embodiment. FIG. 5B illustrates the tri-spray nozzle 500 from the bottom side. FIG. 5C illustrates the tri-spray nozzle from the top side; FIG. 5D illustrates the tri-spray nozzle in an isometric view. FIG. 5E illustrates the tri-spray nozzle from the left side.

Figure 5F:
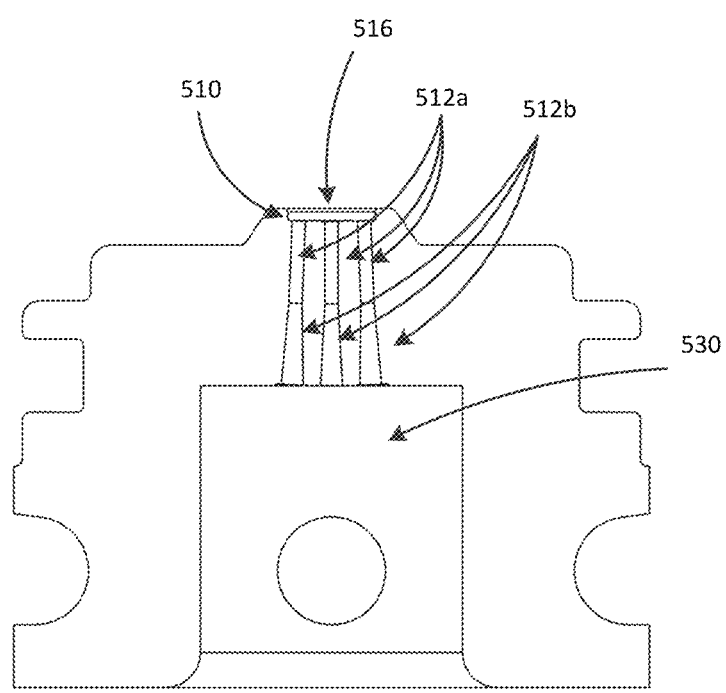
FIG. 5F illustrates a cross-section view of a tri-spray nozzle in an alternate configuration, in one example embodiment.

FIG. 5F illustrates cross-sectional view of an alternative configuration of the tri-spray nozzle. The configuration illustrated is substantially similar to those of FIGS. 5A-5E with a alternatively designed inlet cavity bores 512. In this configuration the inlet cavity bores include a cylindrical laminar flow portion 512a and a conical atomization portion 512b. The cylindrical laminar flow portion 512a is mechanically and fluidically coupled to the bottom side of the nozzle inlet cavity 510. The bottom side of the laminar flow portion is mechanically and fluidically coupled to the top side of the atomization section 512b. The bottom side of the conical atomization portion 512b is mechanically and fluidically coupled to the top side of the outer cavity 530. In this configuration, there is no inner cavity 520. The cylindrical laminar flow section 512a is substantially cylindrical in shape and allows fluid from the nozzle inlet to move downwards towards the plants in the field. The conical atomization section 512b is substantially conical in shape with an expansion in radius from the top side of the conical section to the bottom of the conical section. The conical atomization section 512b allows fluid to move from the nozzle inlet 516 to move downwards towards plants in the field. Generally, in the atomization section 512b a solid flow moving from the nozzle inlet 516 towards the plants begins to break into smaller droplets.

More generally, the two sub-sections of the inlet cavity bores can take any shape or alignment. Additionally, there can be greater than two subsections to the inlet cavity bores. Tailoring sub-section shapes of the inlet cavity bores can assist in tailoring the spray pattern of each nozzle.

VIII. Fan Nozzles

The fan nozzle is a nozzle configured to mechanically and fluidically couple to any of the described valve assemblies and treatment mechanisms. The fan nozzle 600 is designed such that the spray pattern of treatment fluid exiting the fan nozzle is substantially fan shaped when sprayed by the system 100 on crops in a field. Shutting of the flow of fluid through the nozzle 600 is accomplished by having the nozzle itself positioned where the spring plunger 430 seals off the flow. The reduced volume of liquid between the spring plunger 430 and the fan nozzle 600 allows a full spray to develop and shut off nearly instantaneously.

Figure 6A:
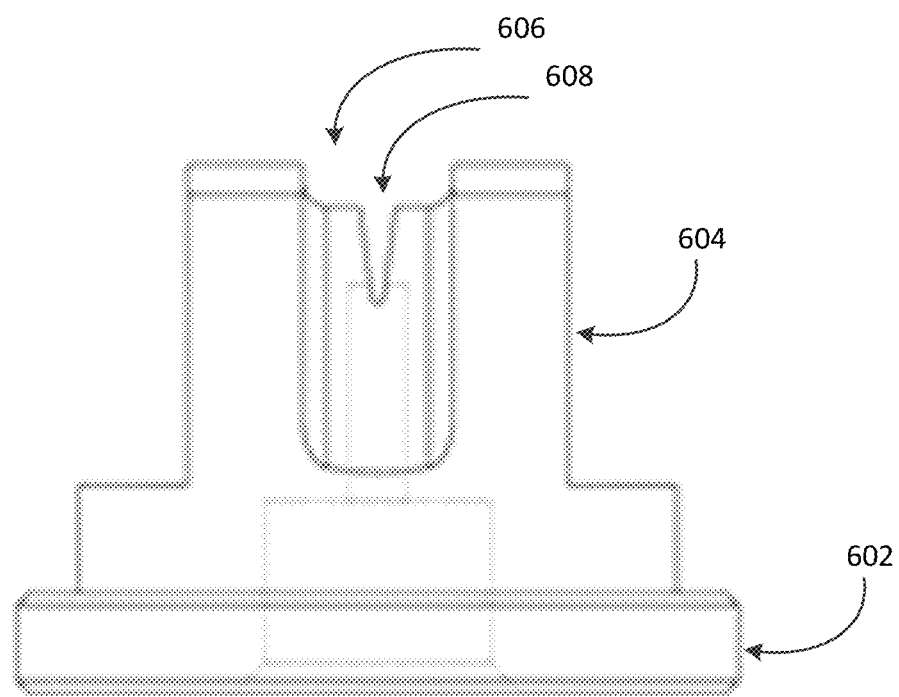
FIG. 6A is a head-on view of a fan nozzle, in one example embodiment.

FIG. 6A is a head-on view of a nozzle, according to a first embodiment. The nozzle may be substantially cylindrical in shape and may feature a circular base 602. The base 602 features a nozzle inlet on its underside (not shown). A nozzle body 604 is connected to the top of the nozzle base 602 and, in the case where both are substantially cylindrical, has a lesser radius than the nozzle base 602. A trough 606, visible head-on in FIG. 6A, bisects the nozzle body 604. The trough 606 features a nozzle exit 608 which is slit-like and is parallel to the inner walls of the trough 606.

Figure 6B:
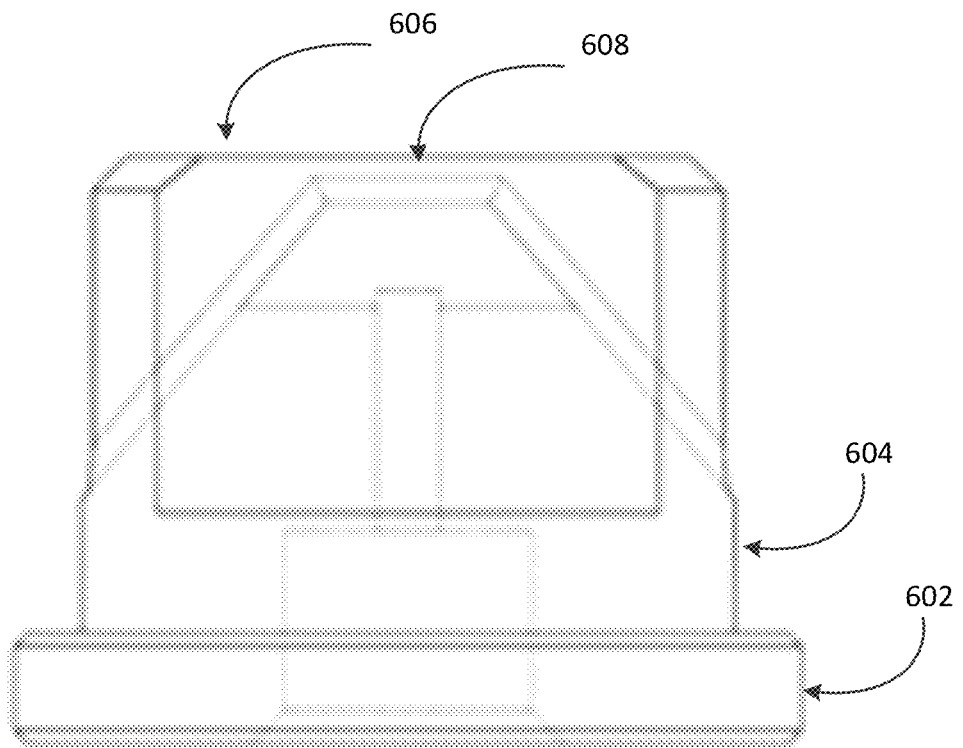
FIG. 6B is a side view of a fan nozzle, in one example embodiment.

FIG. 6B is a side view of the nozzle, according to a first embodiment. The view is transparent such that the nozzle exit 608 is visible through the side of the nozzle body 604.

Figure 6C:
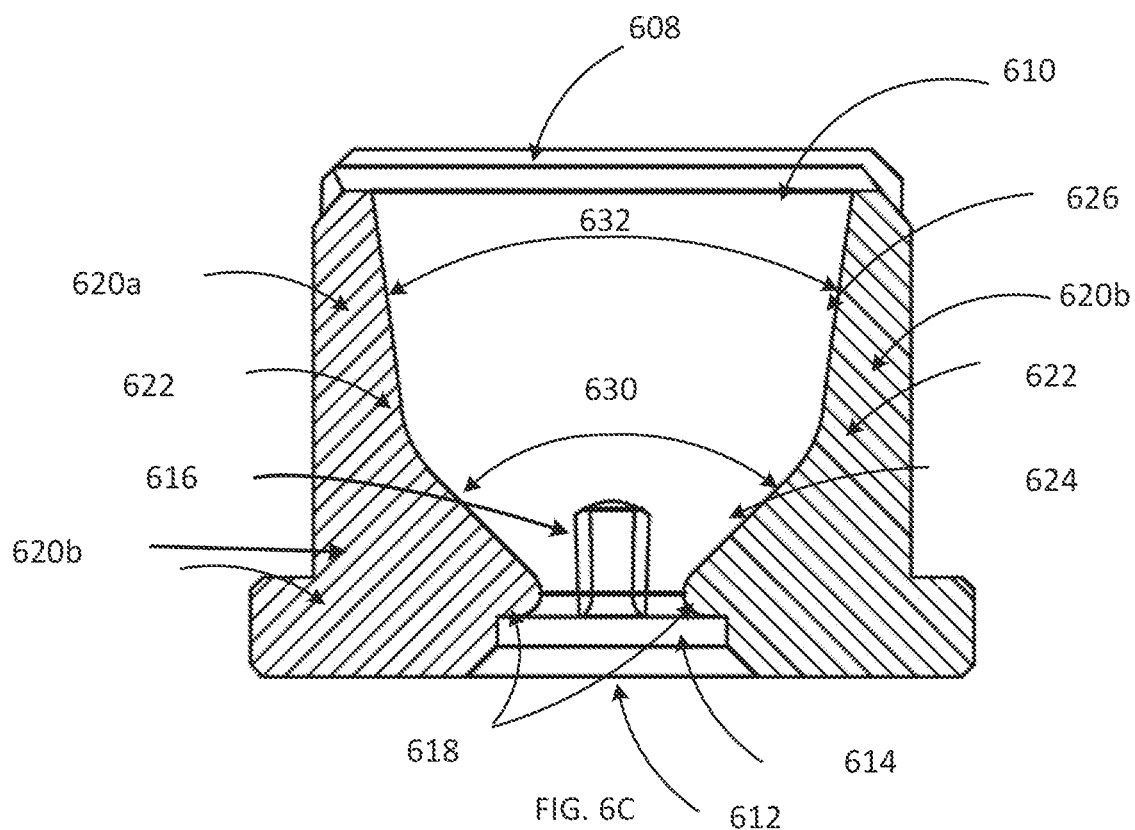
FIG. 6C is a head-on view cross-section of a fan nozzle, in one example embodiment.

FIG. 6C is a front-view cross-section view of the nozzle, according to a second embodiment. The nozzle features a nozzle cavity 610 which diverges along the mid-plane and terminates at the nozzle exit 608. The nozzle inlet 612 is visible at the bottom of the figure. The nozzle inlet 612 directs liquid into an inlet cavity 614, which in turn directs liquid into the fill hold 616. The fill hold 616 releases liquid into the nozzle cavity 610. The nozzle cavity 610 features base fillets 618 at its bottom ends.

The nozzle cavity 610 is bounded by diverging cavity walls 620, each of which features non-parallel upper and lower portions 620a and 620b respectively, resulting in a piece-wise divergent shape. The upper and lower portions 620a and 620b of each cavity wall 620 are joined by a wall fillet 622. The lower portions 620b of the cavity walls 620 diverge from each other at a defined expansion angle 632, thereby forming within the nozzle cavity 610 an expansion area 624. The expansion area 624 acts as an expansion zone for liquid expelled from the fill hold 616 into the nozzle cavity 610. The upper sections 620a of the cavity walls 620 diverge from each other at a defined divergence angle 632, thereby forming within the nozzle cavity 610 a divergence area 626. The cavity walls 620 terminate at opposite ends of the nozzle exit 608.

Figure 6D:
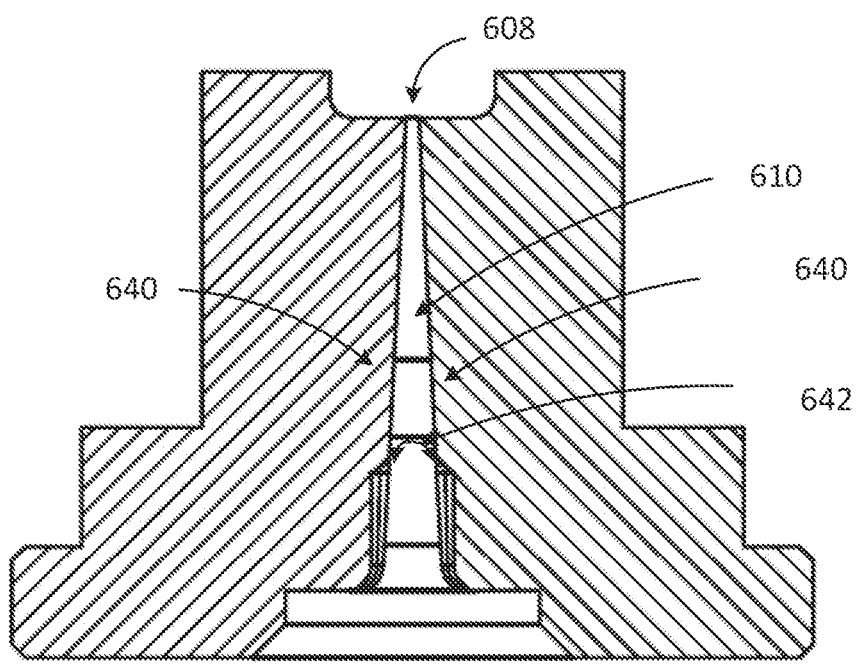
FIG. 6D is side-view cross-section of a fan nozzle, according to a second embodiment.

FIG. 6d is side-view cross-section of the nozzle, according to a second embodiment. This cross-section is perpendicular to the cross-section mid-plane view depicted in FIG. 6A. In FIG. 6C, the nozzle cavity 610 is bounded by two cavity walls 640 which converge toward and terminate at the nozzle exit 608. The cavity walls 640 converge at a defined convergence angle 642.

In alternate embodiments, the cavity walls of the nozzle cavity 610 could be curved, and consequently these angles may vary as a function of position along a central axis running from the center of the nozzle inlet to the center of the nozzle exit 108 (not explicitly labeled). In another embodiment, the lower portions of the cavity walls 620 may be curved, and the upper portions of the cavity walls 620 may be straight. The spray pattern of this nozzle is substantially fan shaped.

IX. Bar Nozzles

The bar nozzle is a nozzle configured to mechanically and fluidically couple to any of the described valve assemblies and treatment mechanisms. The bar nozzle 700 is designed such that the spray pattern of treatment fluid exiting the bar nozzle approximates a rectangular area when sprayed by the system 100 on crops in a field. Shutting of the flow of fluid through the nozzle is accomplished by having the nozzle itself positioned where the spring plunger seals off the flow. The reduced volume of liquid between the spring plunger and the nozzle allows a full spray to develop and shut off nearly instantaneously.

Figure 7A:
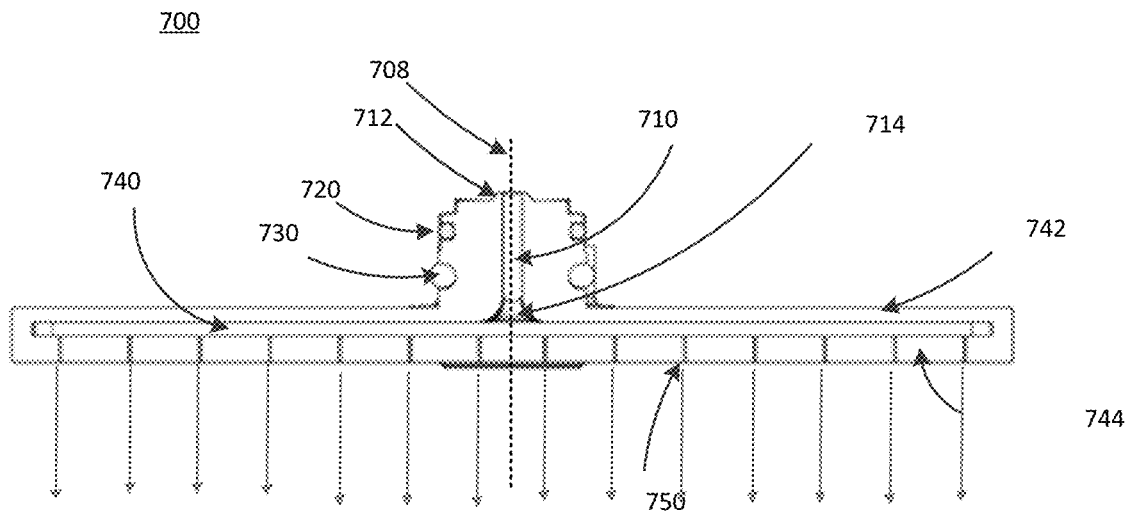
FIG. 7A is a head-on view cross-section of a bar nozzle, in one example embodiment.
Figure 7B:
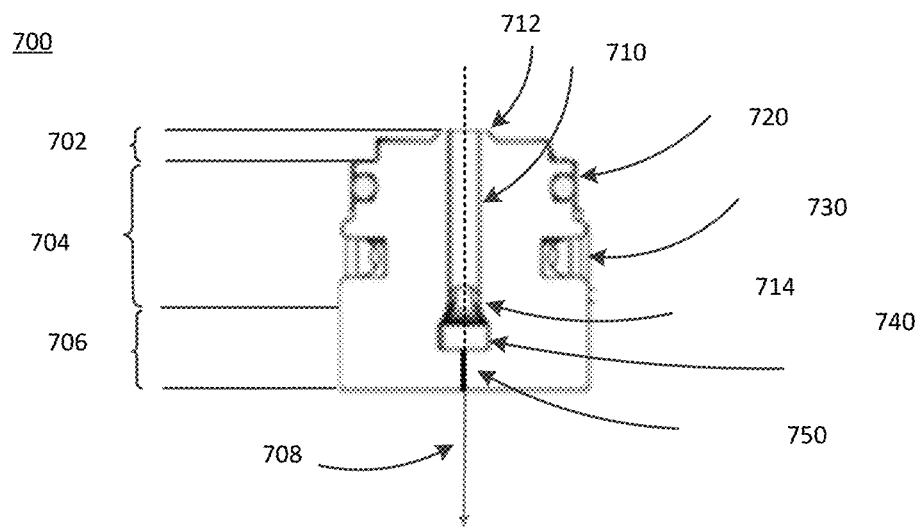
FIG. 7B is a side view cross-section of a bar nozzle, in one example embodiment.

FIGS. 7A and 7B show cross-sectional views of a bar nozzle used by the system from the front and from the left side, respectively, according to one embodiment. The bar nozzle 700 can be described in three sections: the nozzle head 702, the nozzle body 704, and the nozzle tail 706. Additionally, the bar nozzle and its constituent sections and components have a top side (e.g. to the top of the page in the orientation of FIG. 7A), a bottom side (e.g. to the bottom of the page in the orientation of FIG. 7A), a front side (e.g. out of the page in the orientation of FIG. 7A), a back side (e.g. in to the page in the orientation of FIG. 7A), a distal side (e.g. away from the nozzle midline 708), and a proximal side (e.g. towards the nozzle midline 708).

The nozzle head 702 is shaped as a cylindrical annulus with a cavity centered about the nozzle midline 708 coupled to the bottom side of a cylindrical pyramid with a top flat surface and a central circular cavity centered about the nozzle midline 708. The proximal facing sidewalls of the cylindrical pyramid and cylindrical annulus cavities are coaxially centered about the nozzle midline 708 and form at least some portion of the inlet cavity 710. The top side of the nozzle head can mechanically couple can mechanically couple with the bottom of the spring plunger and rubber seal of the valve assembly (not shown). The top side nozzle head includes a nozzle inlet 712 that couples which can fluidically couple the inlet cavity with the valve assembly when the solenoid of the valve assembly mechanically decouples the spring plunger and rubber seal from the top side of the nozzle head 702.

The nozzle body 704 is coupled to the bottom side of the nozzle head. The nozzle body 704 is substantially shaped as a cylindrical annulus with the proximal facing sidewalls of the cylindrical annulus centered about the nozzle midline 708 and forming at least some portion of the inlet cavity 710. The distal facing sidewalls of the nozzle body 704 can be configured with any number of ridges or grooves to assist in mechanically coupling other components of the bar nozzle 700 to the nozzle body 704.

In the illustrated embodiment, near the top side of the nozzle body 704 is a groove configured for mechanically coupling the bar nozzle O-ring 720 to the nozzle body 704. The bar nozzle O-ring 720 is a mechanical gasket in the shape of a torus configured to be seated between the distal facing sidewalls of the nozzle body 704 and the proximal facing sidewalls of the fill cavity of the valve assembly. The bar nozzle O-ring 720 is compressed during the mechanical coupling of the bar nozzle 700 and the valve assembly such that a fluid tight seal is created.

In the illustrated embodiment, near the bottom side of the nozzle body 704 is a groove on the distal facing sidewalls of the nozzle body 704 configured for mechanically coupling the bar nozzle 700 to a pull-tab 730. The pull tab 730 is configured to allow an operator of the system to remove the bar nozzle from the valve assembly. The pull tab 730 can be any mechanical component such as a pull-ring, a latch, a handle, a knob, a ridge, or any other mechanical component that allows the removal of the nozzle from the valve assembly.

The bottom side of the nozzle body 704 is coupled to the top side of nozzle tail 706. The nozzle tail 706 is a substantially rectangular shape including an upper fill cavity wall 742 and a lower fill cavity wall 744 with its short axis parallel to the manifold path its long axis parallel to the nozzle axis. The upper fill wall and lower fill wall are configured such that when the two are coupled the bar nozzle includes a fill cavity 740 bounded by two walls. The upper fill cavity wall fluidically couples the fill cavity to the inlet cavity 710 through a divergence area 714, the divergence area a contoured cavity in the nozzle tail configured to spread fluid from the inlet cavity 710 to the fill cavity 740. The lower fill cavity 744 wall includes an array of nozzle exits 750 orthogonal to the plane of the crop field configured to allow fluid from the fill cavity to exit the nozzle towards the external environment. The treatment fluid sprays out from each nozzle exits in a column, the group of columns approximating a rectangle.

Figure 7C:
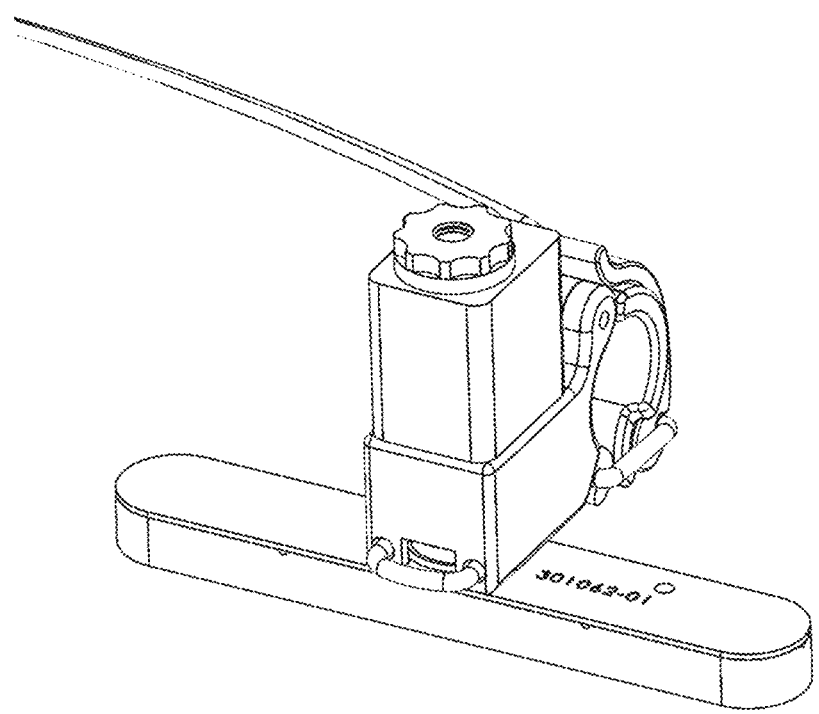
FIG. 7C illustrates an isometric view of a bar nozzle coupled to a valve assembly, in one example embodiment.

FIG. 7C illustrates an isometric view of a bar nozzle coupled to a valve assembly.

Figure 7D:
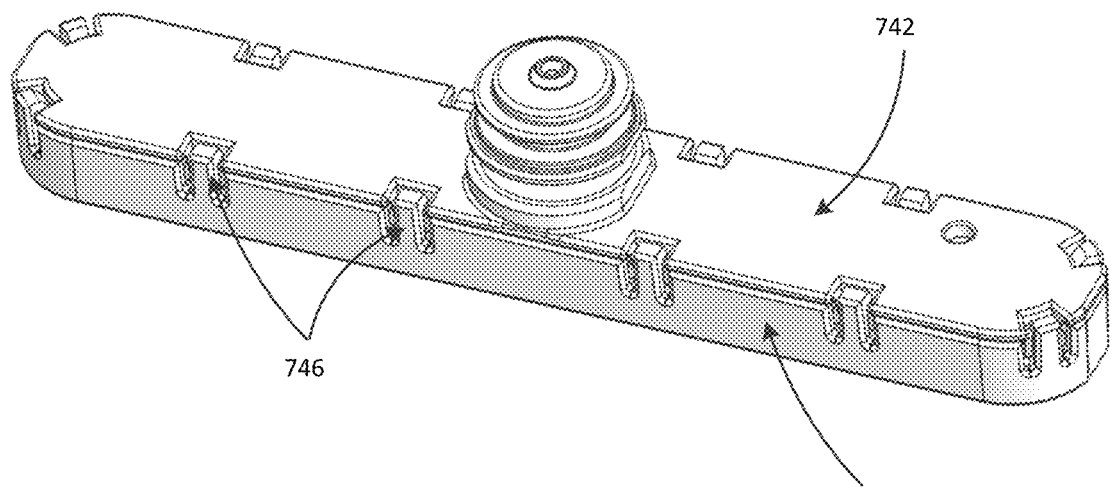
FIG. 7D illustrates an isometric view of a bar nozzle in an alternative configuration, in one example embodiment.

FIG. 7D illustrates an isometric view of a bar nozzle in an alternative configuration. The configuration illustrated is substantially similar to those of FIGS. 7A-7C with a alternatively designed upper fill cavity wall and lower fill cavity wall. In the illustrated configuration, the upper fill cavity wall 742 and the lower fill cavity wall 744 can be joined by any number of latching mechanisms 746. The latching mechanisms can be a latch, a hinge, a clasp, a hook, Velcro, glue, or any other suitable means of joining to walls. In this configuration, the lower fill cavity 744 wall can be configured with any number of nozzle exits or any shape of nozzle exit to affect the shape, pattern, or density of the spray of treatment fluid as it moves out of the nozzle. Further, the upper 742 and lower 744 fill cavity walls can include any number of components to create a fluid tight seal at the interface between the two walls, such as a gasket, an O-ring, a waterproof sealant, a waterproof tape, or similar. Alternatively, rather than a component creating a fluid tight seal, the upper 742 and lower 744 cavity walls can be designed and configured such that their mechanical coupling forms a fluid tight seal without additional components.

Figure 7E:
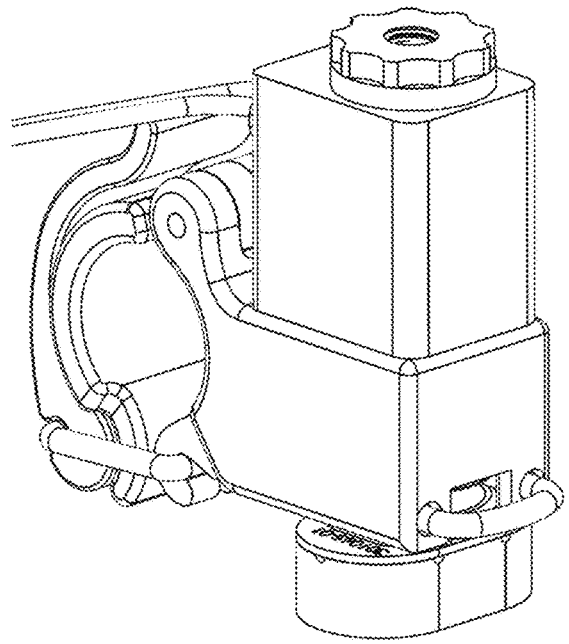
FIG. 7E illustrates an isometric view of a bar nozzle in an alternative configuration, in one example embodiment.
Figure 7F:
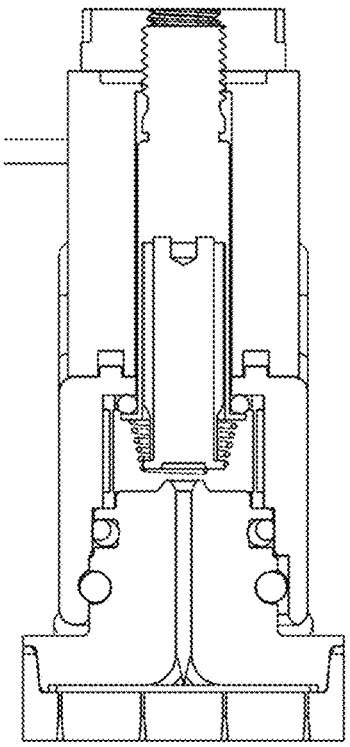
FIG. 7F is a head-on view cross-section of a bar nozzle in an alternative configuration, in one example embodiment.

FIG. 7E-7F illustrates an isometric view and cross-section view of a bar nozzle in an alternative configuration, respectively. The configuration illustrated is substantially similar to those of FIGS. 7A-7C with an alternatively designed upper fill cavity wall 742 and lower fill cavity wall 744. In the illustrated configuration the upper fill cavity wall and lower fill cavity wall are substantially shorter than those of FIGS. 7A-7C. The upper 742 and lower fill cavity walls 744 can take be configured in any length to tailor the spray pattern and the amount of area to which the spray is applied as fluid exits the nozzle.

X. Deflected Fan Nozzle

The deflected fan nozzle is a nozzle configured to mechanically and fluidically couple to any of the described valve assemblies and treatment mechanisms. The deflected fan nozzle 800 is designed such that the spray pattern of treatment fluid exiting the deflected fan nozzle approximates a fan that when sprayed by the system and interacts with the crops of the field at an angle. Shutting of the flow of fluid through the nozzle is accomplished by having the nozzle itself positioned where the spring plunger seals off the flow. The reduced volume of liquid between the spring plunger and the nozzle allows a full spray to develop and shut off nearly instantaneously.

FIG. 8A shows a cross-sectional view of a deflected fan nozzle used by the system from the side, according to one embodiment. FIG. 8B shows an isometric view of the deflected fan nozzle, according to one embodiment. The deflected fan nozzle 800 can be described in three sections: the nozzle head 802, the nozzle body 804, and the nozzle tail 806. Additionally, the deflected fan nozzle and its constituent sections and components have a top side (e.g. to the top of the page in the orientation of FIG. 8A), a bottom side (e.g. to the bottom of the page in the orientation of FIG. 8A), a front side (e.g. out of the page in the orientation of FIG. 8A), a back side (e.g. in to the page in the orientation of FIG. 8A), a distal side (e.g. away from the nozzle midline 808), and a proximal side (e.g. towards the nozzle midline 808).

The nozzle head 802 is shaped as a cylindrical annulus with a cavity running through the nozzle head coupled to the bottom side of a cylindrical pyramid with a top flat surface and a central cavity centered about the nozzle midline 808. The proximal facing sidewalls of the cylindrical annulus cavity form at least some portion of the inlet cavity bore 810. The proximal facing sidewalls of the cylindrical pyramid cavity form at least some portion of the inlet cavity 820. The top side of the nozzle head 802 can mechanically couple with the bottom of the spring plunger and rubber seal of the valve assembly (not shown). The top side nozzle head 802 includes a nozzle inlet 822 which can fluidically couple the inlet cavity 820 with the valve assembly 400 when the solenoid of the valve assembly mechanically decouples the spring plunger 410 and rubber seal from the top side of the nozzle head 802. The bottom side of the inlet cavity 820 is coupled to the top side of the inlet cavity bore three inlet cavity bore 810.

The inlet cavity bore 810 are channels through the nozzle head 804 and nozzle body 804 to the nozzle tail 806 which couple the inlet cavity 820 to the inner cavity 830. The inlet cavity bore is angled across the nozzle midline 808 at a 15° angle. In the illustrated configuration, the inlet cavity bore 810 is oriented such that the treatment fluid diverges away from the midline of the nozzle 808 when the treatment fluid is sprayed. Further, when then treatment fluid interacts with the plant material it approximates an offset fan. In alternate embodiments, there may be any number of inlet cavity bores 810, and each of the inlet cavity bores 810 can take any angle relative to the midline 808 of the deflected fan nozzle 800 such that the treatment fluid moves substantially downwards towards the crops when the fluid is sprayed by the nozzle 800. Varying the angle and number of inlet cavity bores can be used to configure the size and shape of the nozzle spray pattern.

The nozzle body 804 is coupled to the bottom side of the nozzle head 802. The nozzle body 804 is substantially shaped as a cylindrical annulus with a top portion of the proximal facing sidewalls of the cylindrical annulus and forming at least some portion of the inlet nozzle bore 810 and a bottom portion of the proximal facing sidewalls forming at least some portion of the inner cavity 830. The inner cavity sidewalls 832 are divergently angle from the nozzle midline such that the inner cavity expands as from the middle of the nozzle body to the bottom of the nozzle body. The distal facing sidewalls of the nozzle body 804 can be configured with any number of ridges or grooves to assist in mechanically coupling other components of the deflected fan nozzle 800 to the nozzle body 804.

In the illustrated embodiment, near the top side of the nozzle body 804 is a groove configured for mechanically coupling the deflected fan nozzle O-ring 840 to the nozzle body 804. The deflected fan nozzle O-ring 840 is a mechanical gasket in the shape of a torus configured to be seated between the distal facing sidewalls of the nozzle body 840 and the of the proximal facing sidewalls of the fill cavity 452 of the valve assembly 400. The deflected fan nozzle O-ring 840 is compressed during the mechanical coupling of the deflected fan nozzle 800 and the valve assembly 400 such that a fluid tight seal is created.

In the illustrated embodiment, near the bottom side of the nozzle body 804 is a groove on the distal facing sidewalls of the nozzle body 804 configured for mechanically coupling the deflected fan nozzle 800 to a pull-tab 850. The pull tab 850 is configured to allow an operator of the system to remove the deflected fan nozzle from the valve assembly 400 and treatment mechanism 120. The pull tab 850 can be any mechanical component such as a pull-ring, a latch, a handle, a knob, a ridge, or any other mechanical component that allows the removal of the nozzle from the valve assembly.

The bottom side of the nozzle body 804 is coupled to the top side of nozzle tail 806. The nozzle tail 806 is substantially shaped as a cylindrical annulus with the proximal facing sidewalls of the cylindrical annulus centered about the nozzle midline 808 and forming at least some portion of the inner cavity 830. The inner cavity sidewalls in the nozzle tail continue the sidewall divergence to the nozzle exit 860. The inlet nozzle bore fluidically couples the inlet cavity to the inner cavity.

The deflected fan nozzle also includes a flow guide 870. The flow guide is a mechanical structure coupled to the top side of the inner cavity and configured to assist in shaping the spray pattern of the treatment fluid as it exits the nozzle 800. The flow guide 870 is substantially rectangular in shape with a channel 872 structured on one face of the flow guide such that the flow guide includes two flow guide sidewalls 874. The channel 872 of the flow guide 870 may have a radius of curvature such that the flow of treatment fluid as it exits the nozzle is deflected away from the nozzle midline 808. In some configurations, the bottom side of the flow guide may not be parallel to the top side and can take any angle, the angle to assist in tailoring the spray pattern.

Figure 8A:
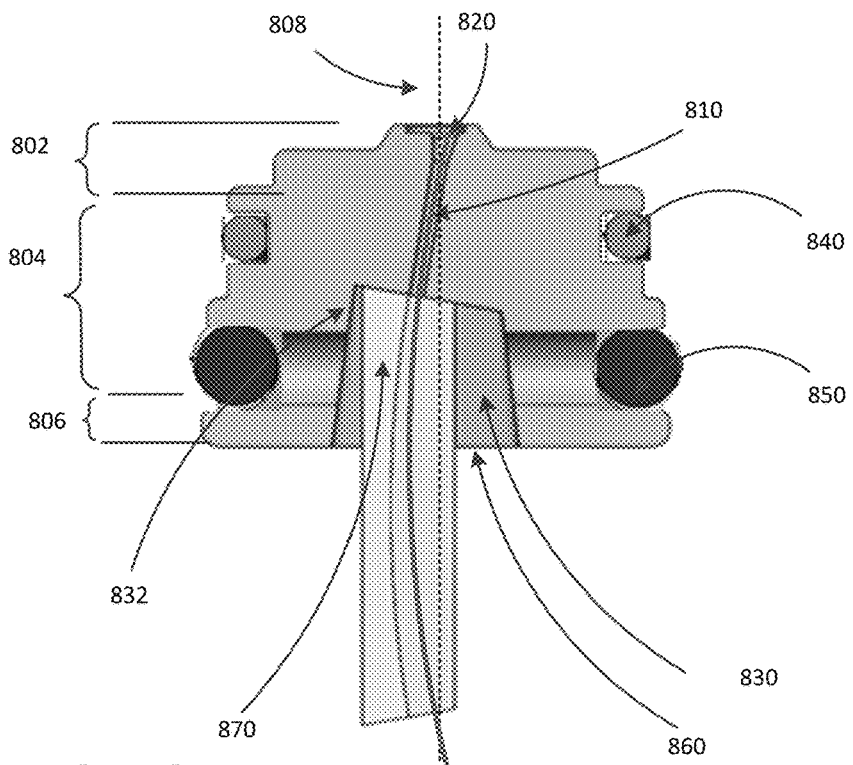
FIG. 8A is a cross section view of an offset fan nozzle, in one example embodiment.
Figure 8B:
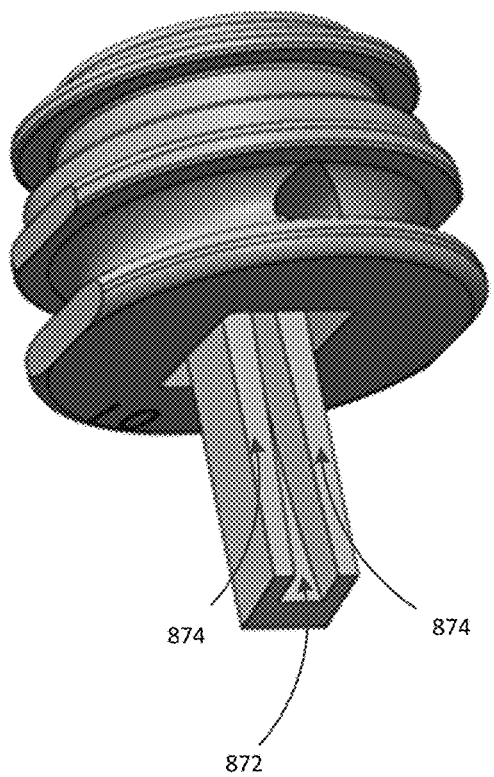
FIG. 8B is an isometric view of an offset fan nozzle, in one example embodiment.

FIG. 8B shows an isometric view of the deflected fan nozzle from different viewpoints with the pull tab removed and O-ring, according to one embodiment.

XI. System Control Architecture

Figure 9:
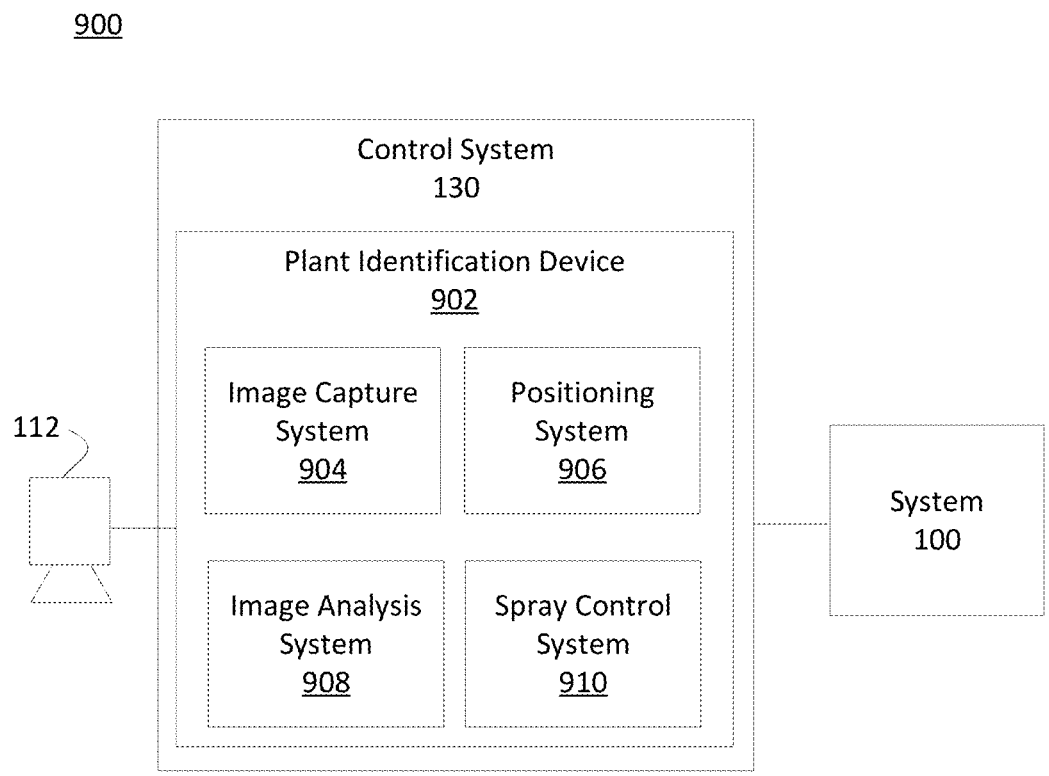
FIG. 9 is a block diagram of an environment in which captured images can be used to identify unique plant features for treatment, according to one embodiment.

FIG. 9 is a block diagram of a combined system 900 for capturing images that can be used to identify unique plant features to be sprayed as the system 100 moves through the field, according to one embodiment. In this example, plant identification device 902 is either a part of, or is physically connected to the control system 130 of the system 100. One or more cameras 112 of the detection system 110 associated with the device 902 capture images of crops being grown in the field.

Generally, the cameras 112 capture data in a digital format where image data is stored at the granularity of pixels or subpixels. The cameras 112 are affixed to the device 902 so as to be relatively close to the crops themselves when images captured. In one example embodiment, the approximate distance between the cameras and plants is on the order of 1-100 inches, a specific example of which is 12 inches. The cameras 112 may include fisheye lenses so that they are each able to capture light over a very wide angle. This allow a single image captured by a camera 112 to capture not only a plant directly in front of the camera 112, but also plants located adjacent to the center plant along the row the vehicle 120 is traveling, something that would not be possible with a lens with a narrower field of view given the short distance between the cameras 112 and the crops.

The image capture system 904 includes logic for communicating with the camera/s 112 to initiate image capture, receive image data, perform any desired processing on it, and communicate it to the crop image analysis system 908. The image capture system 904 may be embodied as computer program software instructions running on computer hardware (e.g., processor, memory, etc.) present on device 902, or it may be dedicated computing hardware (e.g., a field programmable gate array (FPGA)) designed to carry out these processes. This hardware may be shared in common with the positioning system 906, or it may be dedicated and independent hardware included in device 902 to carry out these tasks.

The positioning system 906 includes logic for determining the real-world position of the device 902. This may include global positioning, which may, for example, be provided by a global positioning system (GPS). Global positioning information includes position information at a first scale, and would inform which field, among many, device 902 is located in, and a first order approximation of where the device 902 is within the field, such as which row of crops.

The crop image analysis system 908 receives position and image information from the device 902, analyses it, and stores it for later use depending upon how the information is going to be used. The positions of unique plant features identified by the control system 130 can be used in a variety of different processes as mentioned above, some of which involve using the analyses provided by the control system 130 to carry out some action on device 902, such as the activation of a sprayer via the spray control system 910.

The spray control system 910 determines the activation conditions of sprayers as the system 100 moves through field. Generally, the spray control system sends electrical control signals to the nozzles and valve assemblies to control when the nozzles release treatment fluid. The spray control system may also be configured to change the orientation and configuration of the manifold assemblies, the manifolds, the cassettes, the nozzles, the spray groups, nozzle subsets, and spray patterns to spray plant materials with treatment fluid based on the processes described above. Further, the spray control system may send electrical signals that control the parameters of the spray such as volume of spray, area of spray, duration of spray, pressure of spray, or any other characteristic of the spray.

Depending upon the implementation, the control system 130 may either be a part of the system 100, such as part of a computer physically mounted within the system 100, or it may be a separate computer system communicatively coupled to the system 100, for example via a CAN bus, a short range wireless network (e.g., Bluetooth), a long range wireless network (e.g., Wi-Fi), etc.

The control system 130 may be embodied as computer program software instructions running on computer hardware (e.g., processor, memory, etc.) 102 or it may be dedicated computing hardware itself (e.g., a field programmable gate array (FPGA). This hardware may be shared in common with systems 104 and 106, particularly if they are all co-located, or it may be implemented with its own dedicated and independent hardware.

XII. Additional Configurations

Most generally, the system 100 allows for spraying liquid onto a plant in a field using an array of N nozzle and valve assemblies (e.g., fourteen, however, the exact number may vary in practice) spaced a distance apart (e.g., one inch) that precisely target plant material over a crop's seed line in addition to the space between the adjacent seed lines. This array of nozzles can be grouped into any number sprayer groups and further subdivided into any number of sprayer subsets. The array of nozzles and valve assemblies can be coupled into cassettes and is generally called the manifold. The manifold is placed on an implement towed behind a farming machine such as a tractor. The manifold is oriented such that the line of N sprayers is orthogonal to the direction of travel and parallel to a seed line.

This system 100 can work where the seed lines can be variably spaced, for example anywhere from 8" rows to 42" rows. To allow the system to change between row widths, the manifold is shaped such that adjacent manifolds can nest for close spacing, or be expanded out for wider spaced seed lines.

The manifold assembly 100 allows precision spraying of a plant of any size without affecting neighboring plants or soil. This allows the quantity of chemicals sprayed to be reduced by up to 99% of the quantity used in a traditional broadcast sprayer. The variety of chemicals that can be used in the manifold apparatus is much greater than traditional broadcast sprayers as the manifold can spray chemicals on a weed right next to a crop plant with minimal effect on the crop. This selective spraying allows for a reduction of weeds that build up herbicide resistance yielding a useful lifespan of future crop protectants that can be far longer than what exists today.

The resolution of the manifold can also be configured based on the nozzle types. Some nozzles can be selected to apply treatment to a wide area (e.g. 5" by 1" rectangle) while others may be selected to apply treatment to large circle (e.g. a 4" diameter circle). An example resolution for the smallest target can be as small as a 1 inch by 1 inch square, if not smaller.

In some embodiments, there can be two different types of treatment fluid used by the system. The system can be configured such that some manifolds, nozzles, sprayer groups, or nozzle subsets spray one treatment fluid while other manifolds, nozzles, sprayer groups, or nozzle subsets spray another treatment fluid. The fluidic couplings of the system can be configured to accomplish this with components similar to those described herein for each type of treatment fluid.

In some embodiments, the treatment reservoir can be fluidically coupled to the cassettes and valve assemblies such there is a constant circulation of treatment fluid through the system during operation. The manifolds and manifold assemblies may include any number of treatment feed tubes and pumps coupled to any part of the system to accomplish this. Constant circulation of treatment fluid through the system minimizes the risk of valve assemblies and nozzles clogging and increases the particulate filtration through the system such that general operation is improved.

In the described embodiments, the manifolds of the manifold assembly can be nested to create overlap between adjacent lines of nozzle exits. In some configurations, the cassettes, sprayer groups, and sprayer subsets of the manifolds can further actuated to create overlap between adjacent lines of nozzle exits.

The components of the described embodiments of the manifolds, manifold assemblies, and nozzles have described in specific orientations and directions for ease of description and clarity. However, one skilled in the art will note that these orientations and directions can take other formations such that the functionality of the components is maintained.

In some embodiments, each valve assembly may be coupled to more than one nozzle to allow a single valve assembly to control multiple nozzles. In other embodiments, each nozzle may be coupled to multiple valve assemblies to allow the nozzle to be controlled by multiple valves or use nozzles that require more than one valve.

XIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes described in FIGS. 4-5, are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system, like the ones described in FIGS. 2-3, may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting potential malware using behavioral scanning analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A device for applying a treatment fluid to a plurality of plants in a field comprising:
   a plurality of manifolds, each manifold comprising a plurality of nozzles collectively aligned parallel to a nozzle axis that is substantially perpendicular to a seed line of the plants in the field; and
   a manifold assembly coupling the plurality of manifolds, wherein the manifolds of the manifold assembly are actuatable between:

an open state including a first and a second of the manifolds positioned with no overlap between the nozzles of the first and the second manifold along the nozzle axis, and a nested state including the first manifold and the second manifold positioned with at least some overlap between the nozzles of the first and the second manifold along the nozzle axis.

2. The device of claim 1, wherein in the open state, every manifold of the plurality is positioned with no overlap between the nozzles of adjacent manifolds along the nozzle axis.

3. The device of claim 1, wherein in the closed state, for every pair of adjacent manifolds in the plurality, the nozzles of the adjacent pair wholly overlap along the nozzle axis.

4. The device of claim 1, wherein each manifold of the plurality further comprises:
a plurality of valves fluidically coupling the plurality of nozzles to the manifold, and each valve of the plurality configured to actuate a nozzle to release treatment fluid onto the field.

5. The device of claim 4, wherein:
each nozzle of the plurality includes a nozzle entrance and a nozzle exit,
the plurality of valves fluidically couple the nozzle entrance to the manifold, and
the nozzle exits face the field such that treatment fluid can exit the nozzle exit towards the field.

6. The device of claim 1 further comprising:
a treatment reservoir fluidically coupled to the manifolds, the treatment reservoir storing the treatment fluid for treating the plant material.

7. The device of claim 1 further comprising:
a manifold actuator coupled the manifold assembly, the manifold actuator for configuring the plurality of manifolds between the open state in the nested state.

8. The device of claim 1, further comprising:
a controller configured to:
access an image of the plurality of plants in the field,
identify a plant of the plurality of plants in the image, and
actuate the manifold assembly between the open and closed state such that one or more of the nozzles are above the plant as the device travels past the plant in the field.

9. The device of claim 8, wherein the controller is further configured to:
actuate one or more nozzles to treat the plant with treatment fluid as the device travels past the plant in the field.

10. The device of claim 8, further comprising:
an image acquisition system configured to capture an image of the plurality of plants in the field as the farming machine travels past the plants in the field.

11. A method for treating a plant of a plurality of plants in a field as a farming machine travels past the plant in the field, the method comprising:
identifying the plant in an accessed image of the field, the plant located in a seed line of the field that is substantially perpendicular to a direction of travel of the farming machine;
treating the plant with a treatment fluid from one or more nozzles of a manifold assembly, the treatment comprising an actuation of the manifold assembly from an open state to a closed state, wherein:
the manifold assembly comprises a plurality of manifolds with each manifold of the plurality comprising a plurality of nozzles collectively aligned parallel to a nozzle axis perpendicular to the seed line,
the open state includes a first and a second of the manifolds positioned with no overlap between the nozzles of the first and the second manifold along the nozzle axis, and
a nested state includes the first manifold and the second manifold positioned with at least some overlap between the nozzles of the first and the second manifold along the nozzle axis.

12. The method of claim 11, wherein in the open state, every manifold of the plurality is positioned with no overlap between the nozzles of adjacent manifolds along the nozzle axis.

13. The method of claim 11, wherein in the closed state, for every pair of adjacent manifolds in the plurality, the nozzles of the adjacent pair wholly overlap along the nozzle axis.

14. The method of claim 11, wherein treating the plant in the field each manifold of the plurality further comprises:
a plurality of valves fluidically coupling the plurality of nozzles to the manifold, and each valve of the plurality configured to actuate a nozzle to release treatment fluid onto the field.

15. The method of claim 14, wherein treating the plant in the field further comprises:
actuating the valves to release treatment fluid onto the plant as the device travels past the plant in the field.

16. The method of claim 11, wherein:
each nozzle of the plurality includes a nozzle entrance and a nozzle exit,
the plurality of valves fluidically couple the nozzle entrance to the manifold, and
the nozzle exits face the field such that treatment fluid can exit the nozzle exit towards the field.

17. The method of claim 11:
each of the manifolds is fluidically coupled to a treatment reservoir storing treatment fluid for treating the plant.

18. The method of claim 11, further comprising:
accessing an image of the plurality of plants in the field from an image acquisition system mounted to the device.

19. The method of claim 11, further comprising:
identifying another plant in the accessed image, the other plant located in the seed line; and
treating the other plant by actuating the manifold assembly from the closed state to the open state.

20. The method of claim 11, wherein treating the plant further comprises:
actuating a first nozzle of the plurality to treat the plant according to a first set of treatment instructions; and
actuating a second nozzle of the plurality to treat the plant according to a second set of treatment instructions, the second set of treatment instructions dissimilar from the first set of treatment instructions.

* * * * *